United States Patent
Metsäjoki et al.

(10) Patent No.: US 8,986,489 B2
(45) Date of Patent: Mar. 24, 2015

(54) METHOD FOR ATTACHING LABELS TO ITEMS

(75) Inventors: Kati Metsäjoki, Pirkkala (FI); Noel Mitchell, Wuppertal (DE)

(73) Assignee: UPM Raflatac Oy, Tampere (FI)

( * ) Notice: Subject to any disclaimer, the term of this patent is extended or adjusted under 35 U.S.C. 154(b) by 0 days.

(21) Appl. No.: 13/497,582

(22) PCT Filed: Sep. 24, 2010

(86) PCT No.: PCT/FI2010/050740
§ 371 (c)(1),
(2), (4) Date: Mar. 22, 2012

(87) PCT Pub. No.: WO2011/036347
PCT Pub. Date: Mar. 31, 2011

(65) Prior Publication Data
US 2012/0175053 A1    Jul. 12, 2012

Related U.S. Application Data

(60) Provisional application No. 61/245,342, filed on Sep. 24, 2009.

(51) Int. Cl.
*B29C 65/14* (2006.01)
*G09F 3/10* (2006.01)
*B65C 9/25* (2006.01)
(Continued)

(52) U.S. Cl.
CPC ... *G09F 3/10* (2013.01); *B65C 9/25* (2013.01); *C09J 5/06* (2013.01); *C09J 7/0242* (2013.01); *C09J 7/043* (2013.01); *G09F 2003/025* (2013.01); *G09F 2003/0273* (2013.01); *C09J 2203/334* (2013.01); *C09J 2205/102* (2013.01); *C09J 2205/31* (2013.01);
(Continued)

(58) Field of Classification Search
CPC ............. G06F 3/10; B65C 9/25; C09J 5/06; C09J 7/024; C09J 4/043
USPC .................... 156/272.2, 272.8, 250
See application file for complete search history.

(56) References Cited

U.S. PATENT DOCUMENTS 5,421,933 A * 6/1995 Nedblake et al. ............. 156/249
5,457,080 A   10/1995 Takano et al.
(Continued)

FOREIGN PATENT DOCUMENTS

CN    1966595 A    5/2007
EP    1743927 A2   1/2007
(Continued)

OTHER PUBLICATIONS

PCT/ISA/210—International Search Report—Apr. 19, 2011.
(Continued)

*Primary Examiner* — Daniel McNally
(74) *Attorney, Agent, or Firm* — Venable LLP; Eric J. Franklin

(57) ABSTRACT

A method for attaching a label to a surface of an item. The label includes a carrier layer and a bonding layer. The method includes heating the bonding layer using infrared light such that the infrared light has a maximum spectral irradiance at a peak wavelength. The bonding layer has an absorbing spectral region that spectrally matches with the peak wavelength.

20 Claims, 14 Drawing Sheets

(51) Int. Cl.

| | | |
|---|---|---|
| *C09J 5/06* | (2006.01) | |
| *C09J 7/02* | (2006.01) | |
| *C09J 7/04* | (2006.01) | |
| *G09F 3/02* | (2006.01) | |
| *C08K 5/00* | (2006.01) | |

(52) U.S. Cl.
CPC ......... *C09J 2433/00* (2013.01); *C09J 2475/00* (2013.01); *C09J 2400/283* (2013.01); *C08K 5/0041* (2013.01)
USPC .................................................. 156/272.8

(56) References Cited

U.S. PATENT DOCUMENTS

| | | | |
|---|---|---|---|
| 5,912,204 A | 6/1999 | Yamada et al. | |
| 2003/0041963 A1* | 3/2003 | Gong et al. | ............... 156/272.2 |
| 2004/0123955 A1* | 7/2004 | Kramer et al. | ............... 156/564 |
| 2004/0166309 A1* | 8/2004 | Gong et al. | ................... 428/343 |
| 2005/0153113 A1 | 7/2005 | Hseih et al. | |
| 2006/0062948 A1* | 3/2006 | Kalishek | ...................... 428/34.9 |
| 2007/0014985 A1* | 1/2007 | Yuan-Huffman et al. | 428/355 R |
| 2009/0229734 A1* | 9/2009 | Uber et al. | ...................... 156/64 |

FOREIGN PATENT DOCUMENTS

| | | |
|---|---|---|
| WO | WO-94/14605 A1 | 7/1994 |
| WO | WO 2007045290 A1 * | 4/2007 |

OTHER PUBLICATIONS

European Search Report—Oct. 21, 2013 (Issued in Counterpart Application No. EP 10818468).

Chinese First Office Action (With Translation) Sep. 23, 2013 (Issued in Counterpart Application No. 201080042605.7).

* cited by examiner

Fig. 3d Comparative Example

1

METHOD FOR ATTACHING LABELS TO ITEMS

CROSS-REFERENCE TO RELATED APPLICATIONS

This application claims priority to U.S. provisional patent application 61/245,342 filed 24 Sep. 2009 and is the national phase under 35 U.S.C. § 371 of PCT/FI2010/050740 filed 24 Sep. 2010.

FIELD OF THE INVENTION

The present invention relates to a method for attaching labels to items.

BACKGROUND OF THE INVENTION

Labels may be attached to items e.g. in order to visually show information associated with the item. The information may comprise e.g. trademark of a manufacturer, advertising information, price information, or operating instructions.

There are a number of label decoration technologies available, each possessing various advantages and challenges. Self-adhesive or pressure-sensitive labels are well-known and widely used in the industry. They suffer however from a number of disadvantages which include the fact that the production process is rather complex and in some cases waste material unnecessarily burdening the environment is created.

Referring to FIG. 1, a known label 100 comprises a carrier layer 10, an adhesive layer 20, and a removable release liner 99. The carrier layer 10 may comprise printed patterns 30.

Traditionally, a release liner is first coated on one side with a release agent, typically silicone, and this release layer is cured with heat. Then on top of this cured silicone layer a layer of pressure-sensitive permanently tacky adhesive is formed. This adhesive layer is typically formed by applying a water based adhesive dispersion on the release layer and then using heat to dry to the dispersion to become a pressure sensitive adhesive film. A paper or filmic print-carrier, face stock, is then laminated to the adhesive coated release liner, at which point the adhesive preferentially transfers to this print carrier. Rolls of such a pressure-sensitive laminate can then be supplied to the next party in the value chain, the printers, who print the face-side of the laminate and die-cut out the labels to the required shape and remove the waste matrix, the unused parts of the face side.

The printed label laminate can then be forwarded in the value chain onwards, and the following party responsible of the end use applies the labels to the items or containers requiring labelling. At this phase the release liner becomes a waste product which is a major disposal issue for users of such labels and the industry at large as well as the whole environment.

An alternative where the use of release liner can be avoided, is the use of wet-glue labels where the pre-printed and die-cut paper labels are coated with a wet-adhesive and then applied directly to the item to be labelled. Typically, such wet-glue label operations are rather messy with a large amount of time being lost for clean-up, set-up and changing of label formats. In addition such wet-glue labels almost always exhibit the unsightly gripper marks of the "label-box" on the finished labelled object. Furthermore wet-glue labels are not available with clear films due to the technical problem that the water cannot satisfactorily evaporate and escape from below the labels, always resulting in unsightly bubbles in the label.

2

Another decoration technology is that of shrink-sleeves, in which case the total applied cost is very high and the production process very complex. Shrink-sleeve films are normally printed on wide-web gravure or flexographic presses based on such inks, which could cause environmental and safety hazards. After printing, in a separate offline process the film is formed into a tube and the seams adhered together by the use of a solvent welding process. This tube is then cut into shorter lengths, dropped over the article to be labelled and fed through a shrink-tunnel at high temperature causing the film to shrink and fit the shape of the container. Although this technology has produced a number of eye-catching and appealing results for some target market segments, it has a number of disadvantages. These include the fact that by definition a shrink-sleeve covers the whole surface of the object to be labelled and therefore 180° decoration or a label covering only part of the container surface is not possible. The visibility of unsightly seams on shrink-sleeve labels is also negative issue. It is not in practice possible to use shrink-sleeves for containers with flat sides or with containers with handles.

Further, it is not possible to use paper labels with shrink-sleeves nor is it possible to have a variety of textures or tactile effects. It is also not possible to have spot labels, multiple labels on a container or unique label shapes when using shrink-sleeves. It is also not possible to achieve the so-called "No-label" look with shrink-sleeves, that is, it is not possible to have the label blend into the container colour and material as if the label was not there and that the container was pre-printed.

Still another widely-used label technology is that of wrap-around labels. Wrap-around labels can be produced from either paper or film and can be fed from stationary magazines or fed directly from reels. Typically a hot-melt adhesive is applied to the leading edge of the label which is tightly wrapped around the container being rotated at a controlled speed, with the trailing edge being fixed in place by a second narrow strip of hot-melt adhesive. The major markets for such labels are soft drinks and mineral waters due to the lack of premium look and therefore marketing appeal of the labels. It is not possible in this case to achieve the "No-label" look. The choice of materials is very limited and design variety is restricted to that of simple cylindrical shapes.

SUMMARY OF THE INVENTION

An object of the invention is to provide a method for attaching a label to an item.

According to a first aspect of the invention, there is provided a method for attaching a label (100) to a surface of an item (300), the label (100) comprising a carrier layer (10) and a bonding layer (20), the method comprising heating the bonding layer (20) by using infrared light (IR1) such the infrared light (IR1) has a maximum spectral irradiance at a peak wavelength ($\lambda_P$), wherein the bonding layer (20) has an absorbing spectral region which spectrally matches with said peak wavelength ($\lambda_P$).

The spectral distribution of the heating radiation may be spectrally matched with a region where the bonding layer has a high absorbance.

Thanks to the invention, a higher fraction of the optical power may be utilized for heating the bonding layer. Energy consumption of the process may be reduced.

In an embodiment, components of a label dispensing device may be operate at a lower temperature and/or the components of the label dispensing device may need less effective cooling.

In an embodiment, a high energy density may be used for heating a thermally activatable adhesive of the bonding layer. Consequently, the total time needed for heating the label may be reduced. Thus, the overall energy consumption may be reduced, and/or the speed of attaching the labels to products may be increased.

In an embodiment, the thickness of the carrier layer may be reduced and/or the carrier layer may be made of a material which has a lower softening temperature. Thus, the overall energy consumption may be reduced, and/or less materials may be consumed when producing the labels. Consequently, the production method of the labels may be more economical and/or environmentally friendly.

The use of a release liner may be avoided. Consequently, the amount of waste material may be reduced.

In an embodiment, the label may be handled and stored in a non-tacky state, and it may be converted to a tacky state only after the bonding layer of the label it is in contact with the surface of an item. Thus, handling of a tacky label may be avoided. This is an improvement over known pressure-sensitive labels. In particular, this is an improvement over wet-glue labels.

In an embodiment, the bonding layer may converted to its tacky state by heat prior to application to the surface of the item to be labelled. After contact with the surface, the bonding layer may be cooled.

In an embodiment, the label does not need to completely surround an item. This is an improvement over known shrink-sleeve labels where heat is used for shrinking the label material.

In an embodiment, the label does not have visible seams. This is an improvement over known wrap-around labels.

BRIEF DESCRIPTION OF THE DRAWINGS

In the following examples, the embodiments of the invention will be described in more detail with reference to the appended drawings, in which FIG. 3d shows the spectral absorbance of a carrier layer and the spectral absorbance of a bonding layer.

DETAILED DESCRIPTION

Figure 2:
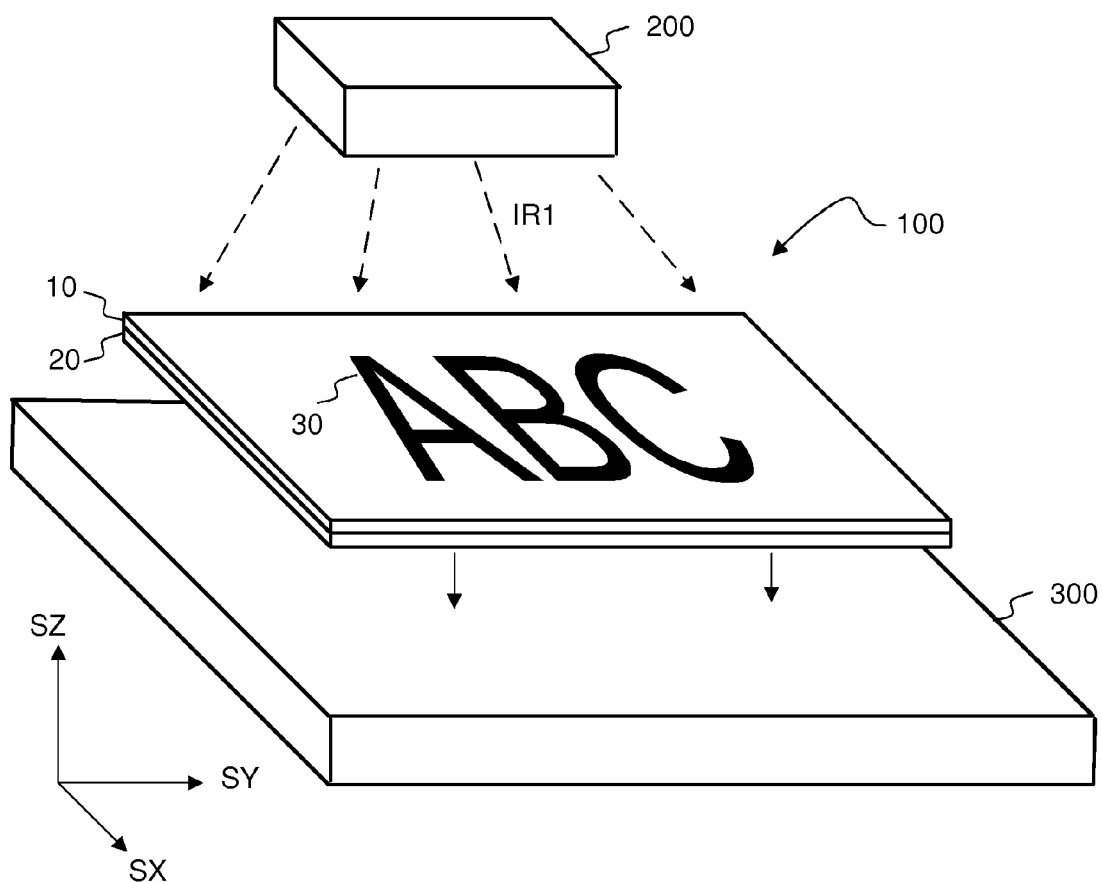
FIG. 2 shows, in a three dimensional view, thermal activation of a bonding layer by radiation.

Referring to FIG. 2, a label 100 may comprise a carrier layer 10 and a bonding layer 20. The label may comprise graphical patterns 30.

The label 100 may be attached to the surface of an item 300 by heating the bonding layer 20 and by pressing the activated bonding layer against the surface. The item 300 may be e.g. a bottle.

This attachment of the label to the item to be labelled is typically performed by a label applicator or label dispenser equipment. Attaching the label to the item 300 may also be called as "dispensing".

The heating may be performed before application of the label to the bottle. i.e. before or during pressing the label 100 against the surface of the item 300.

The heating activates the bonding layer 20, i.e. the state of the bonding layer may be changed from a non-tacky state to a tacky state by heating and thus the activated label behaves like pressure sensitive label, i.e. it can be attached to a surface with aid of a slight pressure.

The heating activates the bonding layer 20, i.e. the state of the bonding layer may be changed from a non-tacky state to a tacky state by heating.

The bonding layer 20 may be heated by infrared light IR1 provided by an infrared light source 200. Infrared light IR1 may also be called as infrared radiation. SX, SY, and SZ denote orthogonal directions.

The light IR1 may be transmitted through the carrier layer 10 before the light IR1 impinges on the bonding layer 20.

The bonding layer 20 may be heated by the light IR1 when the light IR has sufficient optical power at a wavelength range, and the bonding layer 20 absorbs light at said wavelength range.

The light IR1 may also heat the carrier layer 20. However, heating of the carrier layer 20 is typically not necessary when attaching the label 100 to the item 300. In fact, excessive heating of the carrier layer 10 may be useless and may permanently damage the label 100.

The spectral properties of the infrared light IR1 and the spectral properties of the bonding layer 20 may be selected such that the carrier layer 10 is heated less than the bonding layer 20.

In particular, the bonding layer 20 may be heated by using infrared light IR1 such that a maximum spectral irradiance is at a wavelength $\lambda_P$ where a spectral absorbance of the bonding layer 20 is substantially higher than a spectral absorbance of the carrier layer 10.

Figure 3A:
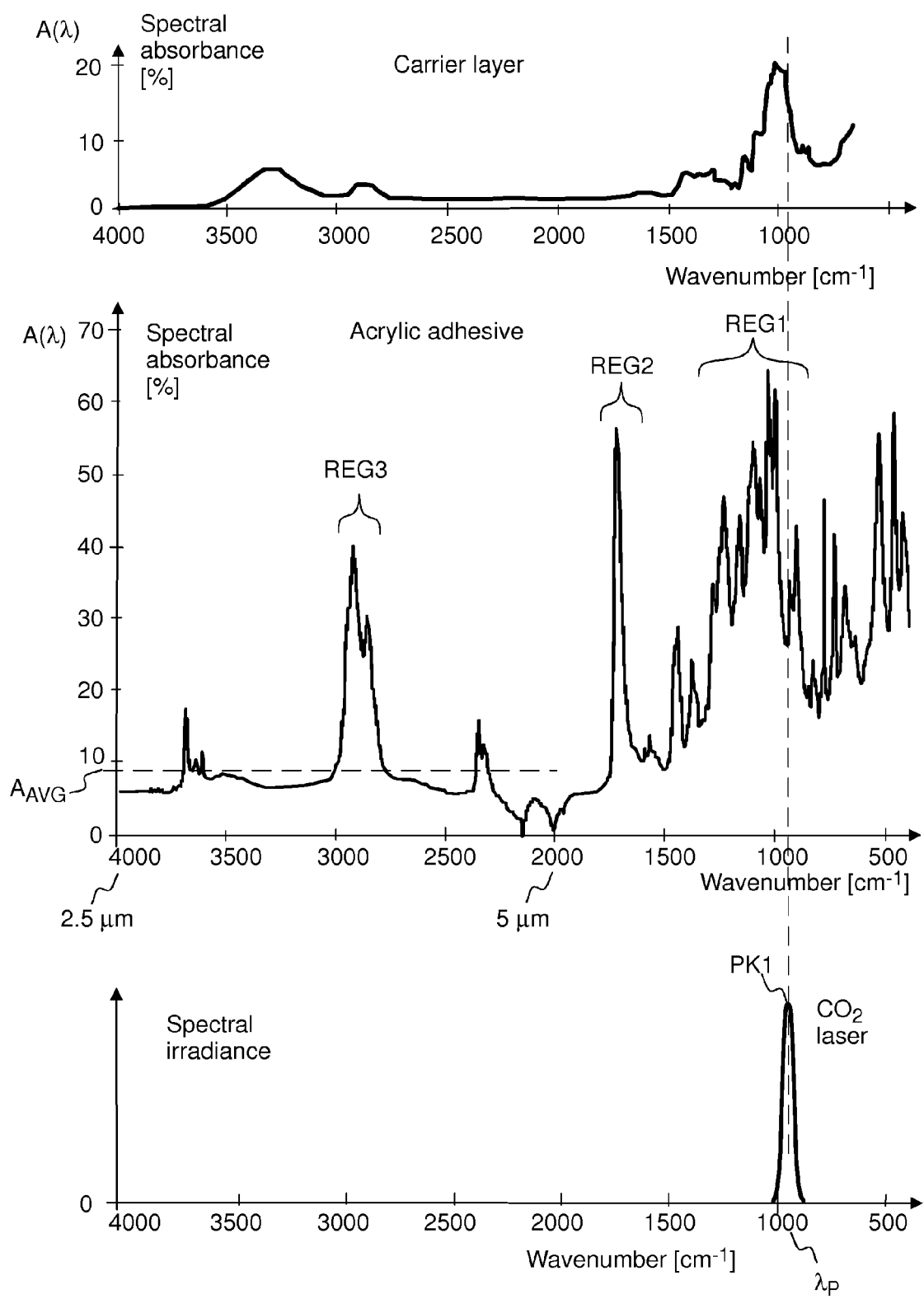
FIG. 3a shows the spectral absorbance of a carrier layer and the spectral absorbance of a bonding layer.

FIG. 3a shows, by way of example, the spectral absorbance of a carrier layer 10 and the spectral absorbance $A(\lambda)$ of a bonding layer 20. The carrier layer is made of paper, and the bonding layer 20 comprises an acrylic adhesive.

Maximum optical power of the infrared light IR1 is radiated at the peak wavelength $\lambda_P$. 90% of optical power of the light IR1 is radiated at wavelengths longer than or equal to the edge wavelength $\lambda_{90}$. The infrared light IR1 may have a spectral peak PK1. The unit of the spectral irradiance may be e.g. $Wm^{-3}$ when the spectral position is expressed in nanometers or $Wm^{-1}$ when the spectral position is expressed in wavenumbers.

The infrared light (IR1) may have a maximum spectral irradiance at a peak wavelength ($\lambda_P$) such that the bonding layer (20) has an absorbing spectral region which spectrally matches with the peak wavelength ($\lambda_P$). The heating radiation IR1 may be spectrally matched e.g. with a spectral region REG1, REG2 and/or REG3 shown in FIG. 3a.

The "matching" may refer to a situation where an absorbing spectral region of the bonding layer 20 spectrally overlaps at least 50% of FWHM width of a spectral peak of irradiation. FWHM refers to full width at half maximum.

Advantageously, the heating radiation IR1 may spectrally match with the highest absorption peak of the bonding layer 20.

The spectral maximum $\lambda_P$ of irradiating light IR1 may be e.g. at the wavelength 10.6 μm. The wavelength 10.6 μm corresponds to the wavenumber 943.4 $cm^{-1}$. The light source 200 may be e.g. a $CO_2$ laser (carbon dioxide laser).

$A_{AVG}$ denotes an average absorbance calculated over a predetermined spectral range. For example, the average absorbance $A_{AVG}$ may be determined e.g. over the wavelength range 2.5 μm to 5 μm, over the wavelength range 2.5 μm to 10 μm, or over the wavelength range 400 nm to 5 μm.

At certain spectral locations, in particular at the spectral peaks, the spectral absorbance $A(\lambda)$ may be substantially higher than the average absorbance $A_{AVG}$.

In particular, the spectral absorbance $A(\lambda)$ may be higher than or equal to two times the average absorbance $A_{AVE}$ calculated over the wavelength range 2.5 μm to 5 μm.

Efficient heating may be ensured when the bonding layer 20 has a high absorbance at a peak wavelength $\lambda_P$ of the infrared light IR1, i.e. at a wavelength of maximum spectral irradiance.

In particular, the bonding layer (20) may be heated by using infrared light (IR1) such the infrared light (IR1) has a maximum spectral irradiance at a peak wavelength ($\lambda_P$), wherein the absorbance of the bonding layer (20) at said peak wavelength ($\lambda_P$) is greater than or equal to two times an average absorbance of the bonding layer (20) in a wavelength range from 2.5 μm to 5 μm.

The spectrum of the infrared light (IR1) may match with the spectral absorbance of the bonding layer (20) such that at least 20% of the optical power of infrared light (IR1) impinging on the bonding layer (20) is absorbed in the bonding layer (20).

The spectral absorbance of the carrier layer 10 may be substantially lower than the the spectral absorbance of the bonding layer at the wavelength $\lambda_P$ of the irradiating light IR1.

The maximum spectral irradiance may be at a wavelength ($\lambda_P$) where a spectral absorbance of the bonding layer (20) is substantially higher than a spectral absorbance of the carrier layer (10).

Figure 3B:
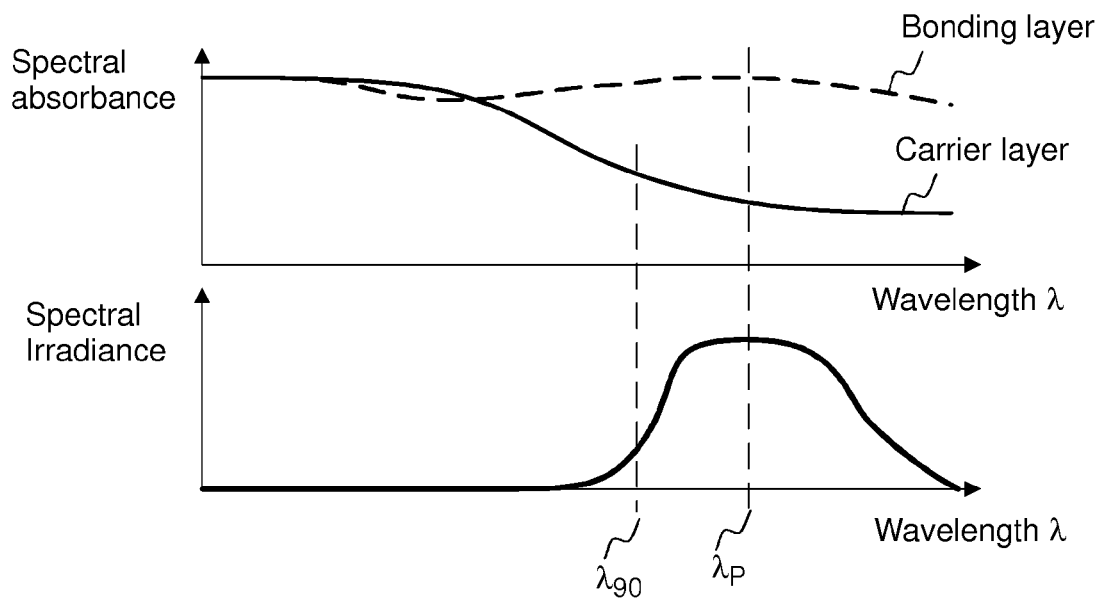
FIG. 3b shows the spectral absorbance of a carrier layer and the spectral absorbance of a bonding layer.
Figure 3C:
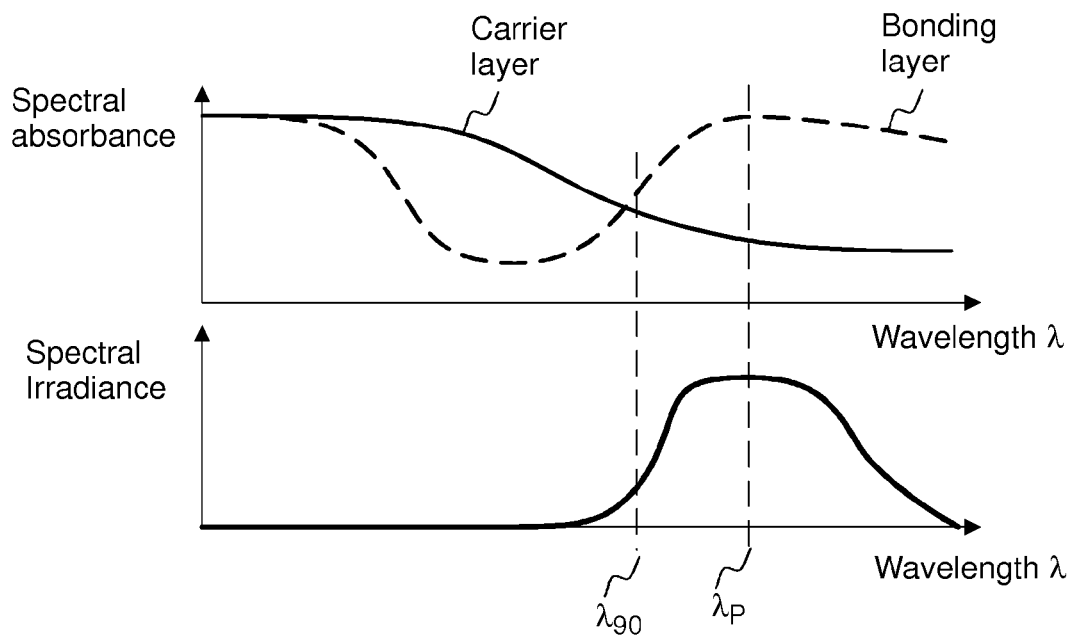
FIG. 3c shows the spectral absorbance of a carrier layer and the spectral absorbance of a bonding layer.

When the spectral properties are matched, there may be a considerable freedom to select the material of the carrier layer 10. Referring to FIGS. 3b and 3c, the carrier layer 10 may have a high absorbance in spectral regions which are outside the spectral region of the irradiating light IR1. Referring to FIG. 3b, the bonding layer 20 may be heated more than the carrier layer 10 even in a situation where the carrier layer 10 has very high absorbance at wavelengths $\lambda$ shorter than the edge wavelength $\lambda_{90}$.

FIG. 3d shows a comparative example where the maximum spectral irradiance is at a wavelength $\lambda_P$, and the spectral absorbance of the bonding layer 20 is relatively low at the wavelength $\lambda_P$. This kind of a situation may lead to inefficient heating of the bonding layer 20. FIG. 3d also shows a situation where the spectral absorbance of the carrier layer 10 is higher than the spectral absorbance of the bonding layer 20 at the wavelength $\lambda_P$. This may lead to overheating of the carrier layer 10 and/or to insufficient heating of the bonding layer 20. Consequently, the label 100 may be damaged and/or the adhesion of the label 100 to the item 300 may be poor.

Figure 4A:
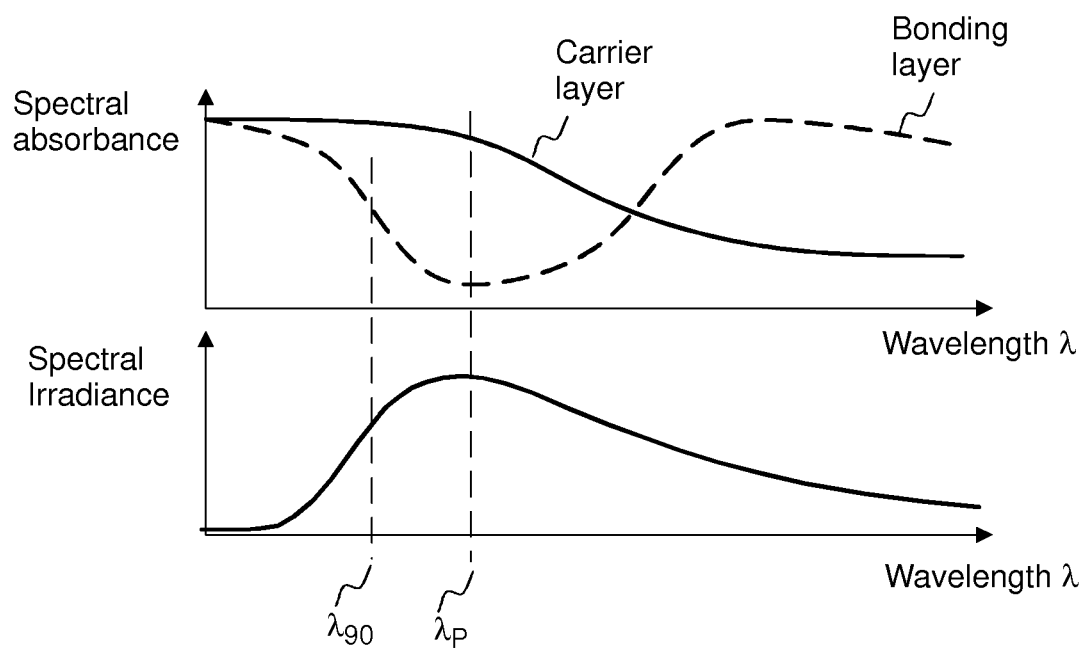
FIG. 4a shows filtering of radiation by using a transmissive optical filter.
Figure 4A:
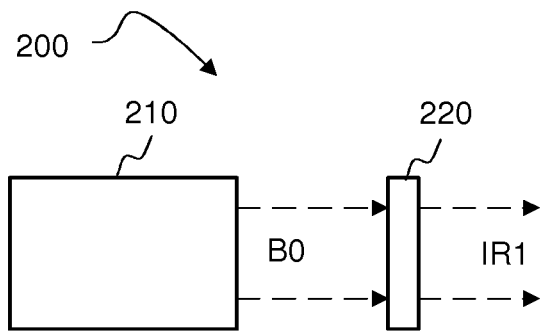
Figure 4B:
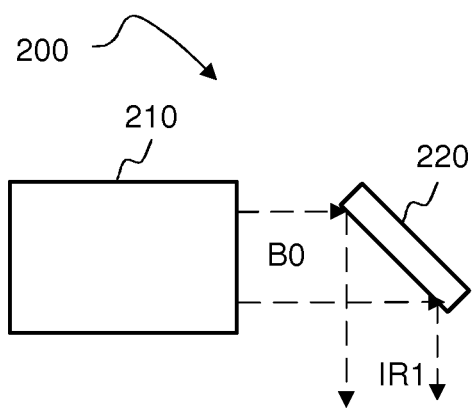
FIG. 4b shows filtering of radiation by using a reflective optical filter.

The spectral properties of the light IR1 may be modified by optical filtering of light B0 emitted by a light source unit 210. The light source unit 210 may be e.g. a laser, a heated glowing object (thermal radiator), or a tungsten halogen lamp. FIG. 4a shows a transmissive optical filter arrangement. In this case the filter 220 may be e.g. a colored glass filter, a dichroic filter, or a dielectric interference filter FIG. 4b shows a reflective optical filter arrangement. In this case the filter may be e.g. a dichroic filter or a dielectric interference filter.

Spectral components whose wavelengths are shorter than a limiting wavelength may be suppressed by optical filtering in order to provide the infrared light IR1. Spectral components whose wavelengths are outside a predetermined range may be suppressed by optical filtering in order to provide the infrared light IR1

Figure 5:
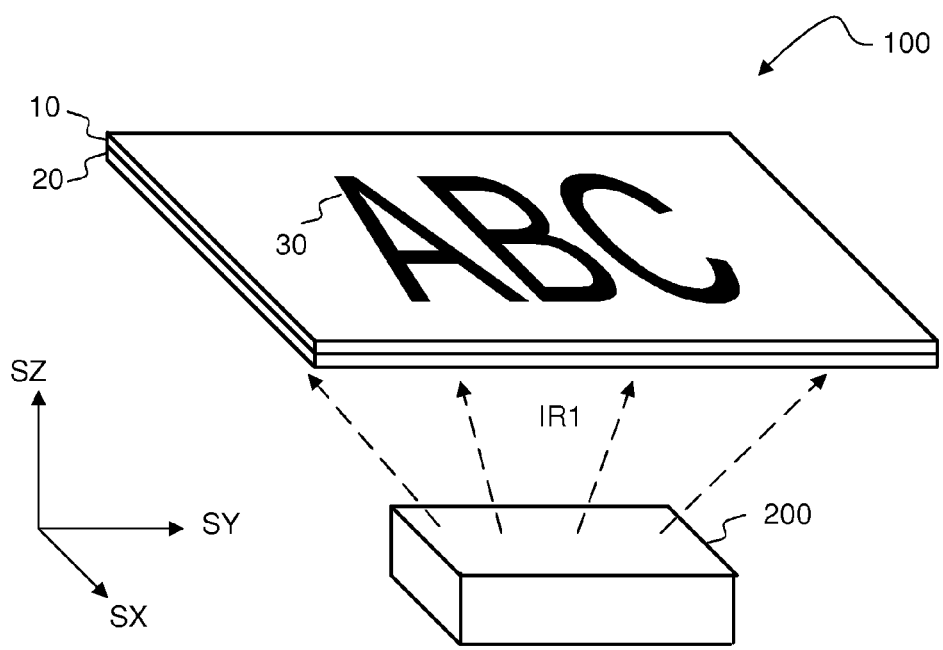
FIG. 5 shows, in a three dimensional view, thermal activation by radiation, which directly impinges on the bonding layer.

Referring to FIG. 5, the infrared light IR1 may impinge on the bonding layer 20 so that the infrared light IR1 is not transmitted through the carrier layer 10 before impinging on the bonding layer 20. This arrangement may provide a very high heating rate.

However, when the transformation of the bonding layer 20 to the tacky state is reversible, the label should be pressed against the surface of the item 300 before cooling of the bonding layer 20. This may be problematic in certain embodiments.

Figure 6:
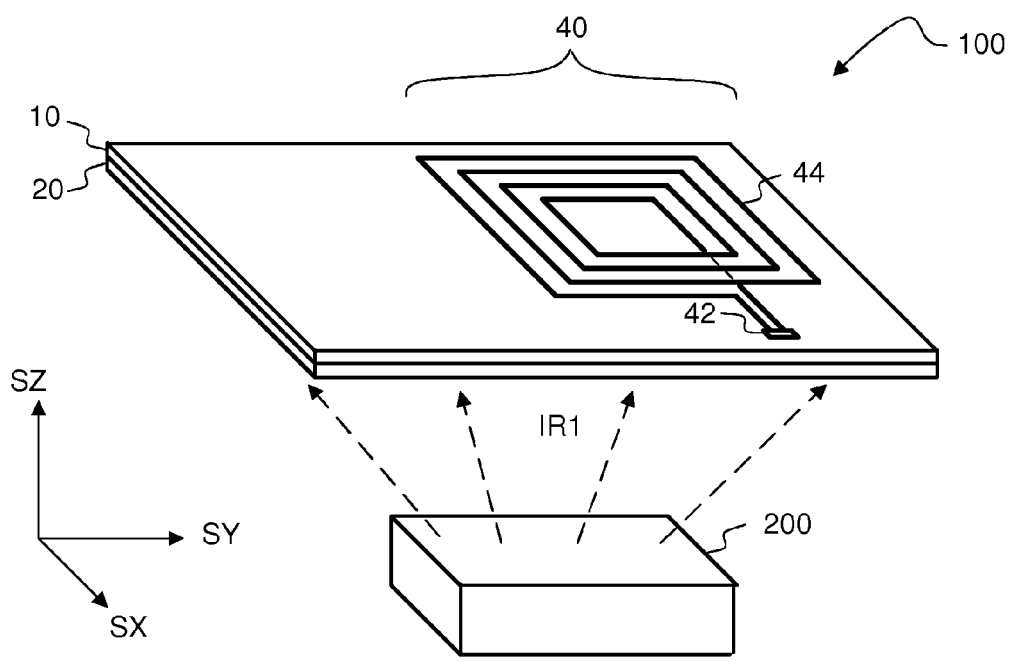
FIG. 6 shows, in a three dimensional view, a label comprising an RFID transponder.

Referring to FIG. 6, the label 100 may comprise an RFID transponder 40. The transponder 40 may comprise an antenna 44 and a RFID chip 42. RFID denotes Radio frequency identification. The RFID chip 42 should not be overheated when attaching the label 100 to the item 300. Having a high absorbance in the bonding layer 20 may be advantageous also for this reason, i.e. the temperature of the carrier layer 10 during the heating may be kept at a safe level.

Figure 7:
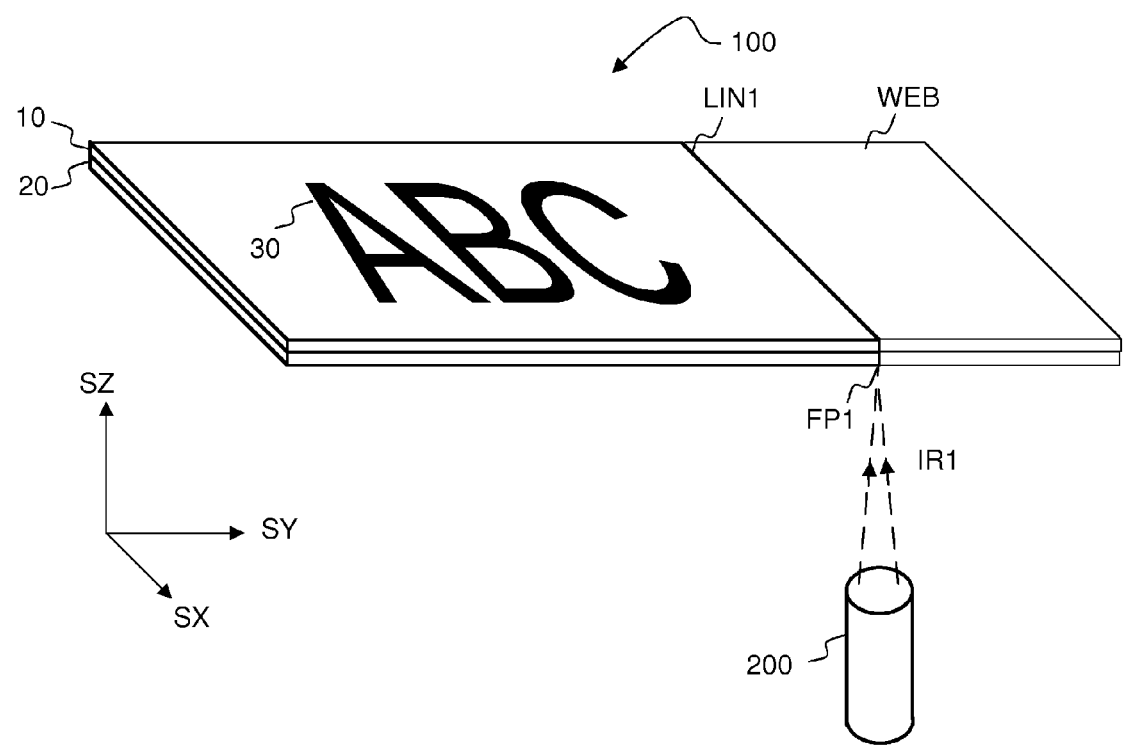
FIG. 7 shows, in a three dimensional view, cutting a label from a web by using an infrared light source.

Referring to FIG. 7, the label 100 may also be cut from a web WEB along a line LIN1 by using a powerful light source 200. The same light source 200 may be used for cutting the label 100 and for heating the bonding layer 20.

The bonding layer 20 comprises an activatable adhesive. The spectral component(s) of the infrared light IR1 may be selected to match with the spectral properties of the bonding layer 20. Furthermore, the material(s) of the carrier layer 10 (facestock) may be selected such that carrier layer 10 is heated less than the bonding layer 20. The outer surface of the bonding layer 20 which will be in contact with the item 300 may reach a higher maximum temperature than an interface between the bonding layer 20 and the carrier layer 10.

Consequently, the thickness of the carrier layer 10 may reduced and/or the carrier layer 10 may comprise materials which cannot withstand high temperatures.

Figure 1:
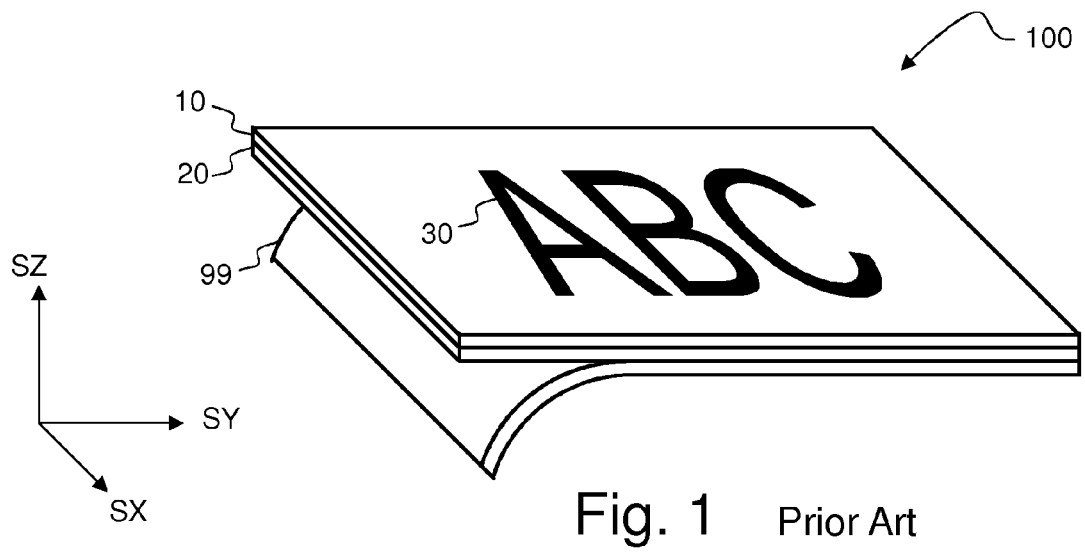
FIG. 1 shows, in a three dimensional view, a label of prior art.

The label 100 comprises a carrier layer 10 (i.e. face stock), the material which carries the printed image. The carrier layer 10 may comprise e.g. a paper or plastic film. The plastic film may be clear or white. The plastic film may be metallised, coloured and/or textured. One side of the carrier layer may be coated with a coating which is dried at elevated temperature and which thereupon forms the bonding layer 20. The bonding layer 20 comprises an activatable adhesive. After drying said coating, The formed bonding layer 20 may be tack-free and non-sticky. When compared with a conventional pressure-sensitive labelstock, the bonding layer 20 does not require use of a special release liner (see FIG. 1). Avoiding the release liner saves vital resources, and simplifies manufacturing. Disposal of the release liner after application of the labels may be avoided. In this case there is no release liner to dispose of, nor is there any silicone involved or applied to the face stock in order to prevent blocking in label rolls, which could interfere with the subsequent printability of the face stock (carrier layer).

After a coating comprising the activatable adhesive has been applied on the carrier layer 10, the coating may be dried, and the carrier layer 10 with the coating 20 may be wound into reels and supplied e.g. to a printer (e.g. for printing graphical patterns) for further processing.

The carrier layer 10 may be printed with any type of print process such as UV-flexo, UV-letterpress, water-based-flexo, gravure, offset, screenprocess, thermal-transfer, direct-thermal hot- or cold-foil stamping. After printing, the labels may be die-cut and supplied in pre-cut form. The labels may have an arbitrary shape and/or design format.

Alternatively, the labels may be supplied in rolls to an application point, where they may be die-cut using laser and be transferred to a vacuum drum, of the type typically used for wrap-around labels, where the non-tacky dry coating on the reverse side of the facestock may be activated by heat. The label 100 may be picked and transferred to desider location by using suction generated by the vacuum drum.

It has been noticed that radiated heat as well as traditional hot-air blasts cannot always activate the adhesives quickly enough in order to enable a commercially viable industrial process. Straightforward increase of the thermal energy from a traditional, broadband, heat source not only increases the energy consumption unnecessarily but also strains heavily both the label material itself and/or overheats unnecessary also other parts of the processing equipment. If this problem is tackled by lowering the maximum temperatures, then the heating devices (e.g. activation tunnels) become longer and/or the speed of a label web needs to be lowered to increase the residence time in a heating zone.

It has been discovered, that the above mentioned problems and challenges may be avoided by tailoring the nature of the thermal activation together with the adhesive to be activated.

Thermal activation refers herein to a separate action when compared to drying or other preparation of an adhesive film when first applying the adhesive coating, typically as a dispersion, on the face stock. Activation means herein actions taken to activate the previously dried or otherwise prepared activatable adhesive layer. In other words, activation means transforming the bonding layer 20 from a substantially non-tacky state to a tacky state. In the tacky state the adhesive may act as a pressure sensitive adhesive.

The bonding layer 20 may comprise e.g. an acrylic adhesives or a polyurethane based adhesive.

The activation may be made e.g. using thermal radiation in a wavelength range, which is in the vicinity of 10 µm. A carbon dioxide laser ($CO_2$) laser may be used, which emits infrared light IR1 at 10.6 µm. The carbon dioxide laser was found to be suitable for heating acrylic and polyurethane based adhesives.

Alternatively, the activation may be made using thermal radiation in the wavelength range in the medium IR, more precisely in the range of 2 µm-3 µm. The maximum spectral power of the heating radiation IR1 may be located at the wavelength 2.5 µm. Infrared radiation in the range of 2 µm-3 µm was found to be applicable for polyurethane based adhesives.

The thermal radiation may be arranged to have energy levels in the range of 3-8 $KJ/m^2$, wherein the activation of the adhesive may take place within 0.2 seconds. Activation times shorter than or equal to 0.2 seconds may be acceptable industrial processes.

The absorption properties of the adhesive of the bonding layer 20 may be modified by adding a dye to the bonding layer 20. The dye may be water soluble. The dye may absorb infrared light IR1. The dye may be substantially transparent in the visible range (VIS) in order to provide clear and visually transparent label structures. Spectral properties of the dye may be selected such that the dye has a high absorbance at a wavelength which is e.g. in the range of 0.8 to 1.6 µm, advantageously in the vicinity of 1 µm (e.g. in the range of 0.9 to 1.2 µm). This makes it possible to use diode laser emitters for thermal activation of the adhesive. The benefit of such emitters is their small size, high efficiency, reliability and ruggedness. Thus, the emitters may be suitable for industrial processes.

Also a tungsten halogen lamp may be used as a light source 200, or a s a light source unit 210 when the bonding layer has considerable absorption in the the vicinity of 1 µm. The radiation spectrum of the tungsten halogen lamp may be modified by using an optical filter (See FIGS. 4a, 4b).

A laser source 200 used as an activation heat source may also be used for cutting the label (See FIG. 7).

The state of the bonding layer 20 may be monitored optically based on a change in the optical properties. For example, the state of the bonding layer 20 may be monitored by monitoring light scattered from the surface of the bonding layer 20. For example, the surface may be smoother in the tacky state than in the non-tacky state. In the non-tacky state, the bonding layer 20 may comprise microscopic grains or cracks, which may substantially disappear when the bonding layer 20 is converted into the tacky state. Consequently, the surface may cause more diffuse reflection in the non-tacky state than in the tacky state. The activation time and/or power levels may be adjusted based on the monitored state of the bonding layer 20. The activation time and/or power levels may be adjusted by using closed-loop control, in particular by using PID control.

The bonding layer 20 may comprise activatable acrylates. The activatable acrylates may be water dispersion based adhesives containing as one component solid plasticizers. When forming the adhesive layer, after applying the dispersion on a substrate, the dispersion may be dried at temperatures low enough not to cause softening and/or melting of the plastizers. Therefore, the evaporation of water from the dispersion may produce a substantially non-tacky adhesive layer. Activation is performed using higher temperatures (energy levels), which cause the plasticers to melt and make the adhesive permanently tacky. This transformation relates to lowering the glass transition temperature Tg of the adhesive. The plasticizers do not crystallize again even after lowering the temperature again and therefore this temperature switching from a non-tacky state to a tacky state is not reversible process. In other words, the transformation of the acrylate adhesive may be irreversible. After thermal activation, the adhesive remains tacky even after cooling.

The bonding layer 20 may comprise activatable polyurethanes. After applying and drying the adhesive to the substrate 10, a non-tacky activatable polyurethane film may be first obtained. The activatable polyurethane film may become tacky by heating the film to a temperature which is higher than or equal to a minimum activation temperature.

The bonding layer 20 may comprise activatable polyurethanes, which comprise polyester segments. After applying and drying the adhesive to the substrate 10, a non-tacky activatable polyurethane film may be first obtained. The activatable polyurethane film may become tacky by heating the film to a temperature which is higher than or equal to a minimum activation temperature. The film may become tacky upon softening of the polyester segments of the film, at temperatures which are higher than or equal to a minimum activation temperature.

Figure 8A:
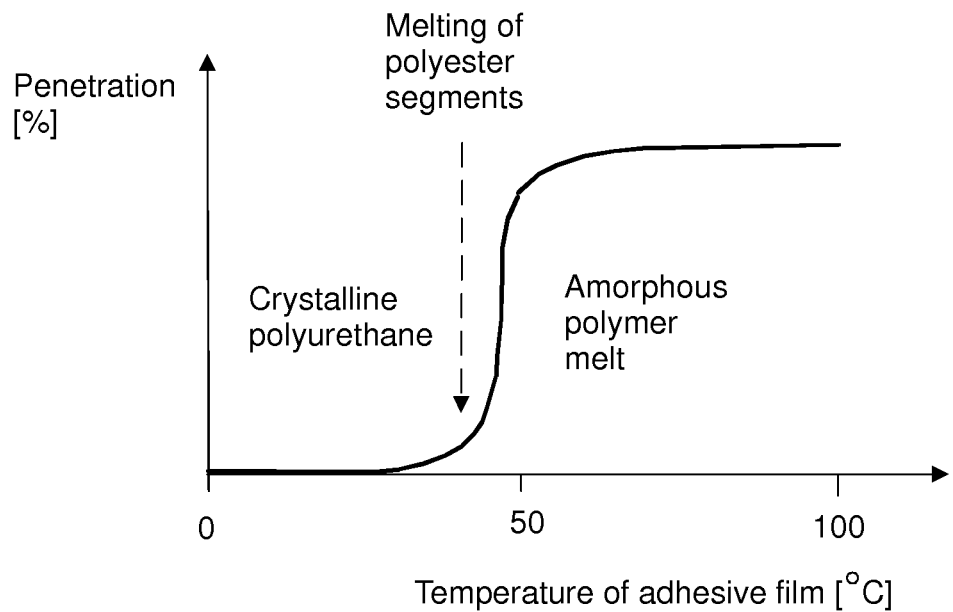
FIG. 8a shows thermal activation of a polyurethane adhesive.

FIG. 8a shows penetration of a test needle into an polyurethane adhesive layer 20. At low temperatures, the test needle has low penetration into the layer 20. At higher temperatures, the layer 20 becomes softer, and the test needle penetrates deeper into the layer 20. At low temperatures, the polyurethane may be in a crystalline state, and at higher temperatures, the layer 20 may comprise soft amorphous polymer.

Figure 8B:
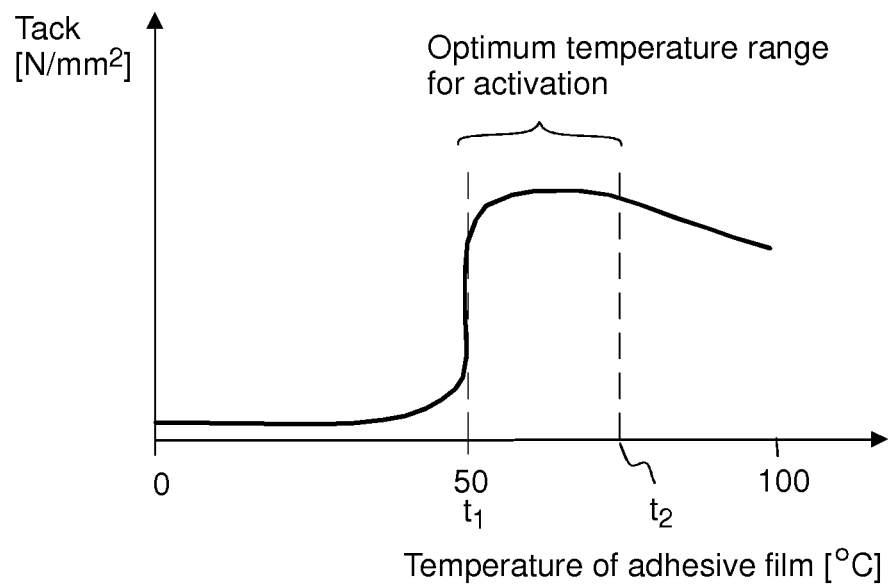
FIG. 8b shows adhesive properties of the polyurethane adhesive of as a function of temperature.

FIG. 8b shows an optimum temperature range from for thermal activation of a bonding layer 20. $t_1$ denotes a lower limit and $t_2$ denotes a higher limit of the optimum range. In particular, the bonding layer 20 may comprise thermally activatable polyurethane, which comprises polyester segments. The optimum temperature range may be e.g. 50-75° C. At temperatures below $t_1$, the adhesive may be in a crystalline state. In the optimum range, the adhesive may be in the amorphous state, and the layer 20 may have a high tack value. The tack value refers to a tensile strength of a bond between the bonding layer 20 and the surface of an item 300, i.e. an adhesion force per unit area. When the activation temperature exceeds the upper limit $t_2$, the layer 20 may become softer so that the tack value starts to decrease. Furthermore, heating the bonding layer 20 to excessively high temperatures may waste energy and time. Furthermore, heating the bonding layer 20 to excessively high temperatures may damage the carrier layer 10.

The time period during which the bonding layer 20 has sufficient tackiness for bonding is called the hot-tack life. During this period, the adhesive may be joined to the surface of the item 300 as a pressure sensitive adhesive. The hot-tack life may range e.g. from seconds to several minutes depending on the structure and chemical composition of the bonding layer 20.

A high initial bond strength may be obtained after a short time, by cooling of the adhesive film and reversible crystallization of polyester segments. The tackiness of these (polyurethane) systems can, so to speak, be switched on and off, enabling a highly effective production process. A further increase in strength may be achieved through a process where the adhesive film is cross-linked and chemically bonded to the substrate (i.e. to the carrier layer 10).

Another characteristic property of heat-activatable polyurethane adhesives comprising polyester segments is that, because of their high molecular weight and segmented polymer structure, the layer 20 may be mechanically stable at temperatures which are higher than the the decrystallization (softening/melting) temperature of the polyester segments. Thus, the layer 20 may exhibit thermoplastic flow to a considerable extent only at temperatures which are significantly higher than the minimum activation temperature.

Acrylic and polyurethane adhesives may be thermally activated when the molecules of the adhesive gain enough thermal energy to overcome a threshold energy of activation. Thermal energy may induce a phase transition from the solid and tack free crystalline molecular structure of the adhesive to an amorphous tacky state. It is in this state that the adhesive may exhibit bonding properties.

In principle, the adhesive could be heated by direct and/or indirect means. Direct methods create heat within the the material itself. In case of indirect heating, thermal energy is transferred to the bonding layer 20 either by conduction, convection or radiation. For dielectric materials, a typical direct heating method is microwave radiation which generates heat via dielectric resonance within the material. Like the microwave heating, irradiative heating does not need an intermediate agent to transfer (conduct) heat to the material. In this sense contact-free methods are better than conductive and convective heating. Speed of activation depends on the total energy absorbed in the adhesive per unit time.

The spectral distribution of heating radiation IR1 is also important in addition to the intensity of the heating radiation IR1. The best efficiency for activation is achieved when the emission spectrum of the radiation source 200 matches the absorption curve of the adhesive of the bonding layer 20. Consequently, the most part of the irradiation may be absorbed and used for heating the bonding layer 20.

Figure 9:
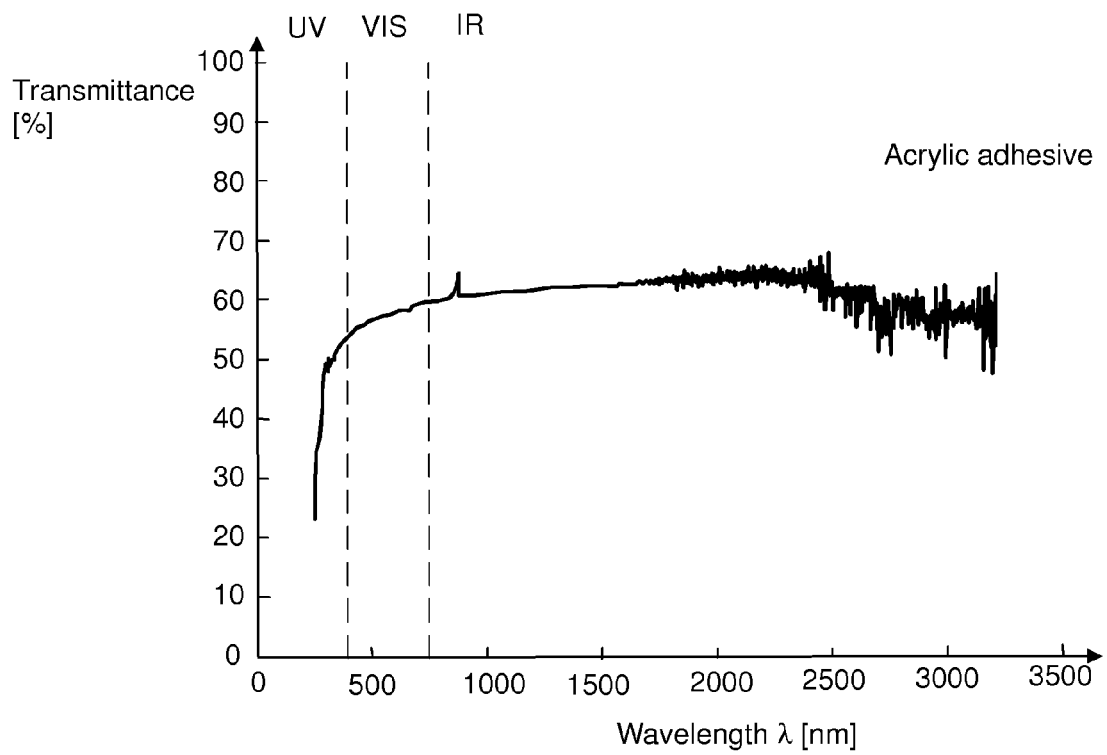
FIG. 9 shows optical transmittance of a thin layer of acrylic adhesive deposited on a glass surface.
Figure 10:
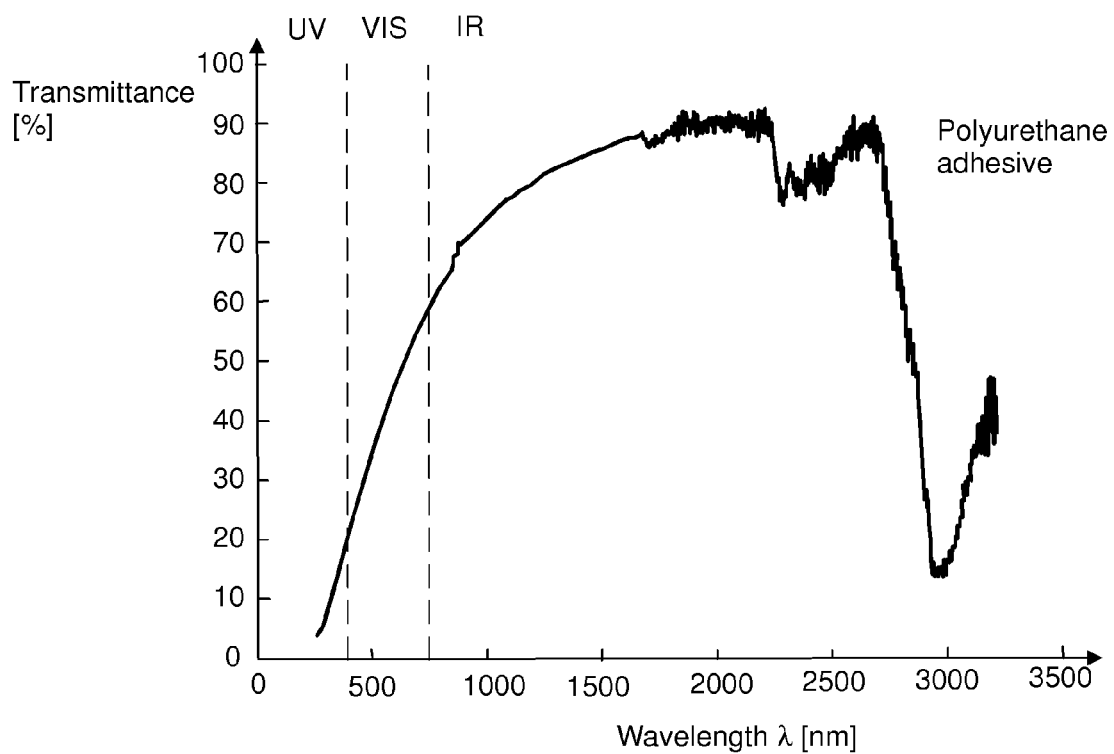
FIG. 10 shows optical transmittance of a thin layer of a polyurethane adhesive deposited on a glass surface.
Figure 11:
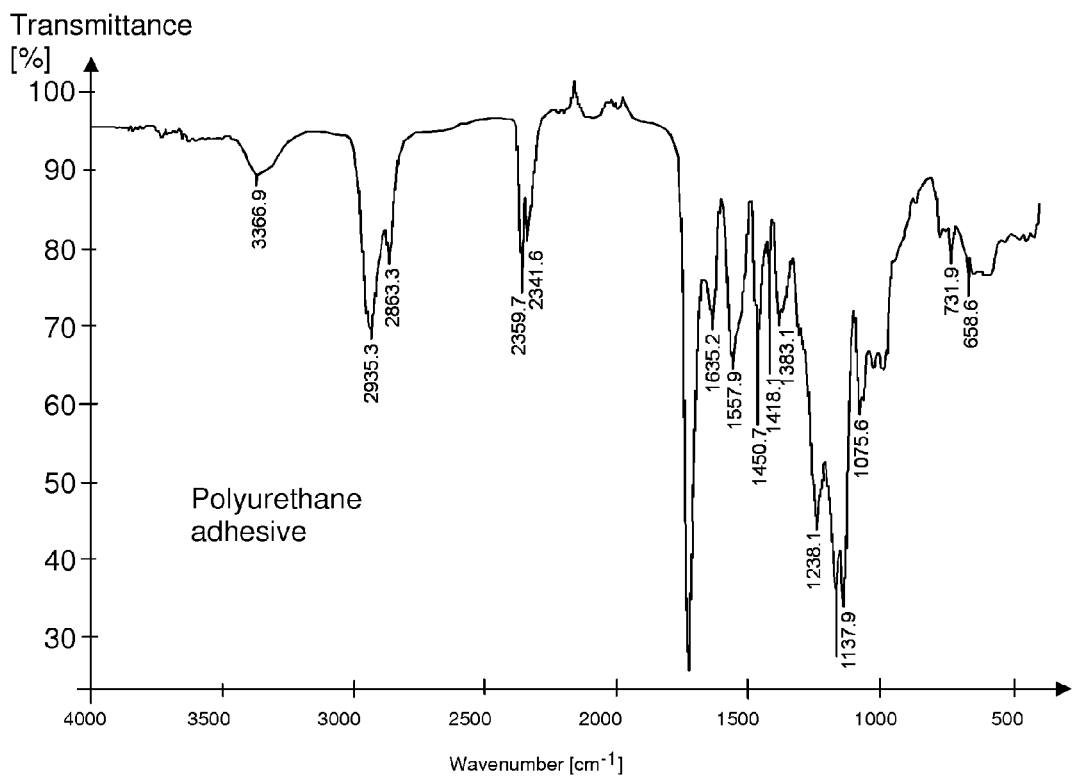
FIG. 11 shows optical transmittance of the polyurethane adhesive determined from FTIR measurements.
Figure 12:
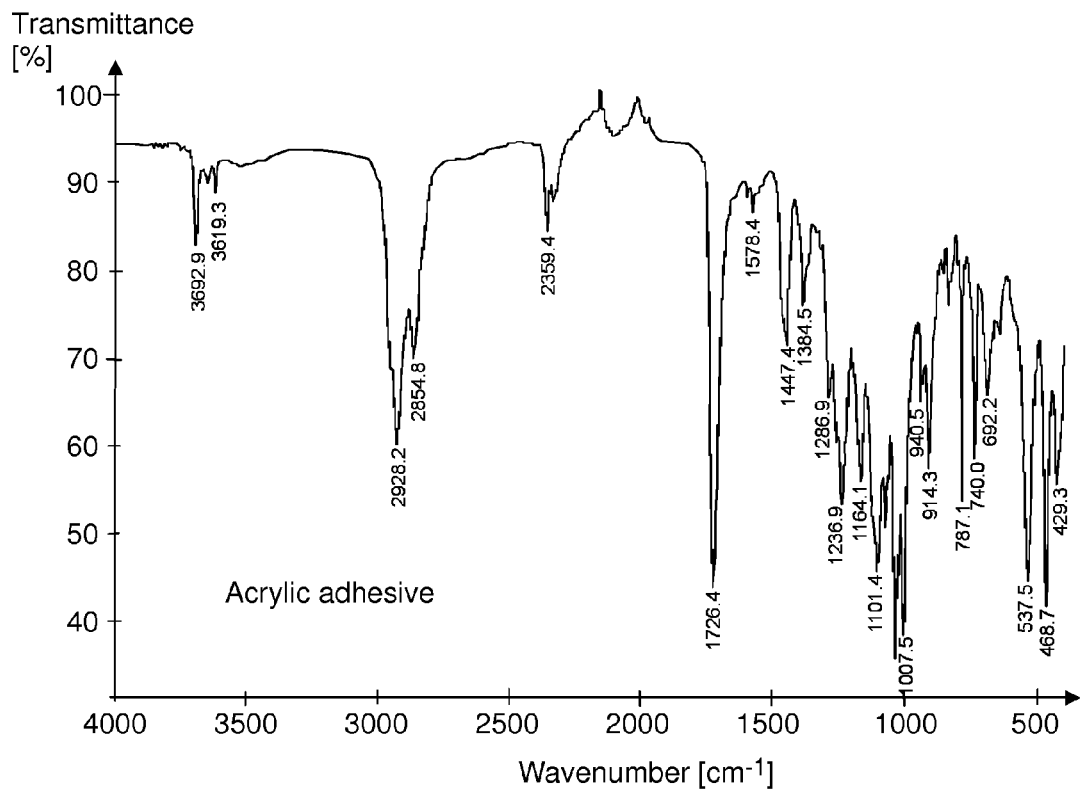
FIG. 12 shows optical transmittance of the acrylate adhesive determined from FTIR measurements.

The spectra of polyurethane and acrylic adhesives shown in FIGS. 9 and 10 in the wavelength range of 250-3200 nm were measured by using a diffractive optical spectrophotometer, and the spectra in FIGS. 11 and 12 in the wavenumber range 4000-500 $cm^{-1}$ were measured by using an FTIR spectrometer. The acronym FTIR refers to Fourier Transform Infrared Spectroscopy. A wavenumber w can be converted to wavelength $\lambda$ according to the equation $w=1/\lambda$. Thus, the wavenumber 4000 $cm^{-1}$ corresponds to the wavelength 2.5 μm, the wavenumber 2000 $cm^{-1}$ corresponds to the wavelength 5 μm, the wavenumber 1000 $cm^{-1}$ corresponds to the wavelength 10 μm, and the wavenumber 500 $cm^{-1}$ corresponds to the wavelength 20 μm.

In FIGS. 11 and 12, the wavenumbers selected absorbance peaks have been indicated next to said peaks. The unit of the wavenumbers is $cm^{-1}$.

The measurements with the diffractive spectrophotometer were based on transmission and therefore the depth of transmission peaks of FIGS. 9 and 10 might slightly deviate from those measured by using an attenuated total reflection system (i.e. a system which measures attenuated total reflectance).

The behaviour or the absorption spectra of the adhesives may be determined from the near ultraviolet (near UV) region to far infrared wavelengths (far IR) by using the data measured by the spectrophotometer and by the FTIR spectrometer. The measured spectra are shown in FIGS. 9-12.

The data in FIGS. 9 and 10 is plotted as transmittance and thereby small transmittance implies high absorption. Thus, small transmittance at a wavelength implies increased absorption of thermal radiation at said wavelength. Thus, small transmittance also implies improved thermal activation of an adhesive.

The transmission spectrum of polyurethane adhesive shows very strong absorption in the vicinity of the wavelength 3 μm. The acrylic adhesive has a rather small transmission throughout the spectrum in FIG. 9 and no especially strong absorption wavelength bands are seen. In case of FIGS. 9 and 10, thin layers of adhesive were applied onto a glass surface. Transmission is proportional to the thickness of the adhesive layer. The effect of the glass was compensated from the results.

The FTIR measurements reported in FIGS. 11 and 12 were based on measuring a reflected signal from the adhesive layers. In this experiment, both samples were few millimeters thick layers of dried adhesive clamped to an ATR diamond crystal surface. The acronym ATR refers to Attenuated Total Reflectance. The transmission spectra of both polyurethane and acrylic adhesive have very strong absorption in the wavelength region around 10 μm (10 μm corresponds to a wavenumber 1000 $cm^{-1}$).

Both spectra in FIGS. 9 and 10 exhibit $1/\lambda^4$ behavior at short wavelengths which is a consequence of Rayleigh scattering. This complicates the analysis of the data in the ultraviolet region but it can be seen that no significant absorptions occur at least in the visible region of spectrum. Small discontinuities in spectra at 880 nm and 1650 nm stem from the measuring device.

Based on the results of FIGS. 9-12 one can conclude that substantially all major absorptions of these adhesives are located at wavelengths greater than 2.5 μm.

The selection of optimal wavelength range(s) for activating the adhesives may be based on absorption properties of the adhesives, taking into consideration the most suitable radiation sources for used in the industrial environment.

Tests were carried out using following devices and methods:
  carbon dioxide laser, peak of irradiance at 10.6 μm,
  LED (light emitting diode) light source Espe Elipar FreeLight, peak or irradiance at 470 nm (irradiance 12 $kW/m^2$, Elipar and Freelight are trademarks of 3M Espe corporation),
  Halogen lamp, peak of irradiance at 1 μm
  Medium wave IR emitter, peak of irradiance at 2.5 μm
  Microwave radiation at the frequency 2.45 GHz
  Wavelength tunable OPO-laser Ekspla NT 342/1/UVE (OPO is an acronym for Optical Parametric Oscillator, NT 342/1/UVE is a trade name of Expla corporation)
  Ekspla NL202, peak of irradiance at 355 nm (NL202 is a trade name of Expla corporation)

A few tests were made in the visible region (VIS) with the OPO-laser Ekspla NT 342/1/UVE. This is a Q-switched laser is that it emits high intensity pulses at a repetition frequency 8-12 Hz. Heating of the bonding layer with this laser is complicated, because a high average power cannot be achieved and the sample has time to emit the absorbed energy away (cool down) between the pulses.

Slightly better results might be achieved by focusing the laser beam to a narrower spot. However, this may lead to damage of the layer 20 due to high local intensities.

A laser whose repetition rate is higher than 500 Hz, and which provides irradiation at the UV range (wavelengths shorter than 380 nm) may cause visually detectable changes in the adhesive layer within seconds. In particular, the peak of irradiance may be located at 355 nm. The laser may be the NL202 laser of the Ekspla corporation. However the size of the beam may be rather small. Heating of large surfaces may be a problem in industrial scale.

Microwave radiation was found to create only minor heating of sample films. Dissipation factor of microwaves in plastic is small. Therefore, only a small portion of the total microwave energy is transferred into heating of the plastic film.

A tungsten halogen lamp may produce a high irradiance. A considerable portion of the spectrum resides in the mid infrared region, i.e. in the range from 3 μm to 8 μm. The acrylic and polyurethane adhesives absorb light in the same regime. However, the peak of the emission spectrum is around 1 μm which means that most of the radiated energy is not in the region where the adhesive films have strong absorbance.

A tungsten halogen lamp may be suitable for thermal activation. Tungsten halogen lamps may be simple, rugged and suitable for use in industry. However, when the spectrum of the irradiance does not match with a strong absorbance of the bonding layer 20, the efficiency of heating may be low, the speed of heating may be low, and/or components of a label dispenser may be needlessly heated. Energy absorbed in the carrier layer 10 may damage the carrier layer 10. In particular, it has been noticed that transparent labels may curl up when irradiated with a halogen lamp.

Absorption properties of the adhesives may be tailored by using a dye which absorbs radiation in a suitable wavelength range. For example, the dye may absorb light in the wavelength range 0.7 μm to 1 μm. In particular, the dye may have strong absorbance around the wavelength 1 μm.

Spectral absorbance of the bonding layer 20 may be modified by adding a water soluble infrared radiation absorbing dye into the adhesive. In this case also a laser diode may be suitable for thermal activation of the bonding layer 20. The light source 200 may comprise semiconductor based diode laser emitters. The benefit of such emitters is their small size, high efficiency, reliability and ruggedness, which makes suitable for industrial processes.

In case of laser diodes, the output power, the shape of the laser beam, and the size of the beam may be easily controllable. Consequently, the same light source 200 may be used for cutting the labels 100 and for heating the bonding layer 20. For example, the adhesive may be first activated by rapidly sweeping/scanning a laser beam over the adhesive area, and the label may be subsequently cut out by increasing the power level and using the laser beam to travel around the edges of the label 100 (FIG. 7). The process can also be performed the other way round, i.e. first cutting the label and then activating the adhesive.

Use of the same radiation source both for cutting and activating the adhesive may improve flexibility of the labelling process. Among other things, this may make it possible to perform activation only for selected portions of the adhesive layer by patterning etc. For example, central area of the bonding layer 20 may comprise second areas which are not heated at all, or which are heated to a lower temperature than first areas of the bonding layer 20. This may further increase the speed and/or energy efficiency of the labelling process. In an embodiment, only edges of the label 100 are converted to a tacky state. In an embodiment, the heated areas may form a mesh pattern, a stripe pattern or a spiral pattern.

For acrylic and polyurethane adhesives without any specific activation improving dyes, the best activation results may be achieved by using infrared radiation IR1. In particular, the light source 200 may be a medium wave infrared heater or a carbon dioxide laser.

It should be taken into account that the selection of the most efficient activation method may stem from finding the best combination (adhesive+activation wavelength+activation energy source) that performs well in practise. Thus, selection of the radiation sources 200 may be significant.

Most infrared emitters (thermal radiators) may be approximated as blackbody radiators. For example, a heated bar of quartz may operate as a thermal radiator. The irradiance spectrum $B_v(T)$ of a blackbody radiator depends on the temperature T, and it can be calculated from Planck's radiation law:

$$B_v(T) = \frac{2\pi h v^3}{c^2} \frac{1}{e^{\frac{hv}{kT}} - 1} \qquad (1)$$

where v is frequency of light, h Planck's constant, k Boltzmann's constant, T is temperature in Kelvin, and c denotes the speed of light.

The irradiance spectrum of a real thermal radiator may also depend on spectral emissivity of a material of the thermal radiator.

The acrylic and polyurethane adhesives may have strong absorptions at wavelengths greater than or equal to 3 µm. The temperature of a thermal radiator may be e.g. in the range of 600 to 800° C. In particular, the temperature of the thermal radiator may be around 680° C. Consequently, the peak of the emission spectrum of the radiator may match with an absorbing spectral region of the adhesive. Blackbody radiator operating at this temperature might give best efficiency in terms of electrical power and absorbed radiation if the total radiated power would be high enough to exceed the activation threshold.

Figure 13:
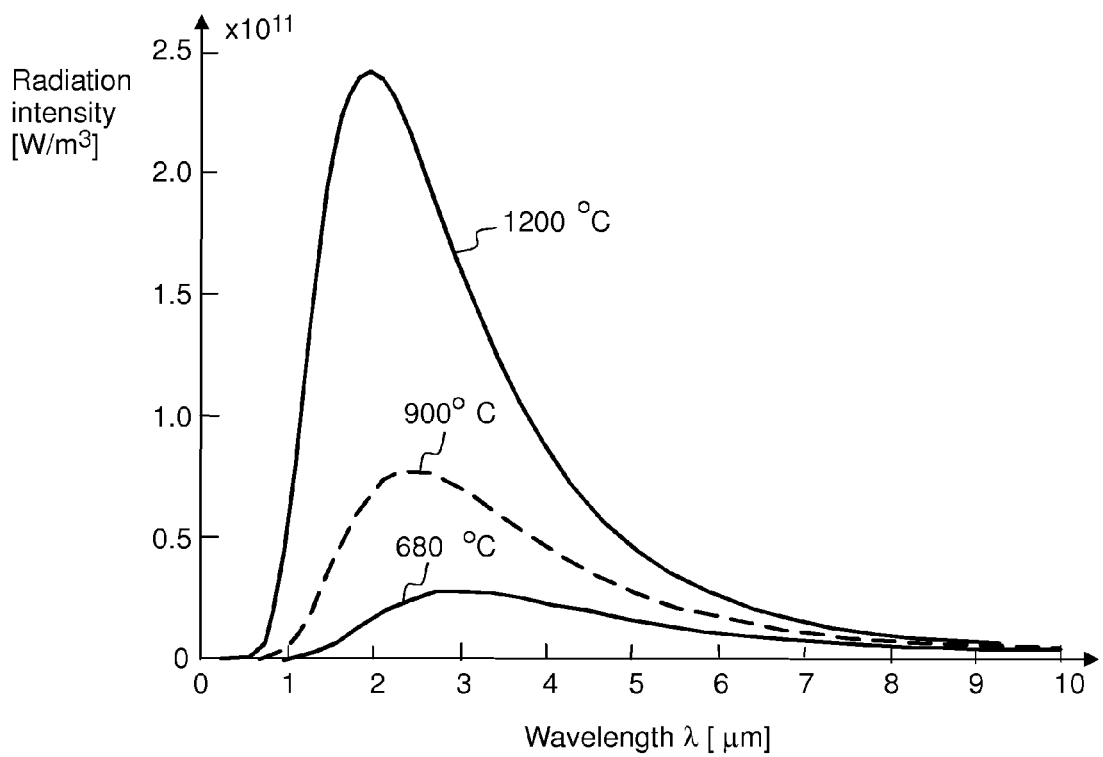
FIG. 13 shows spectral irradiative power of a blackbody radiator at three different temperatures.

However, total irradiative power of a blackbody radiator at this temperature is rather weak. Most suitable commercially available infrared light emitters are so called medium wave IR emitters. They operate at 900° C. and provide more power in far-infrared region at the cost of electrical power. When the temperature of a thermal emitter is increased, the largest increase in power occurs in the short wavelengths of the spectrum. FIG. 13 shows the spectral irradiative power of a blackbody at different temperatures.

Figure 14:
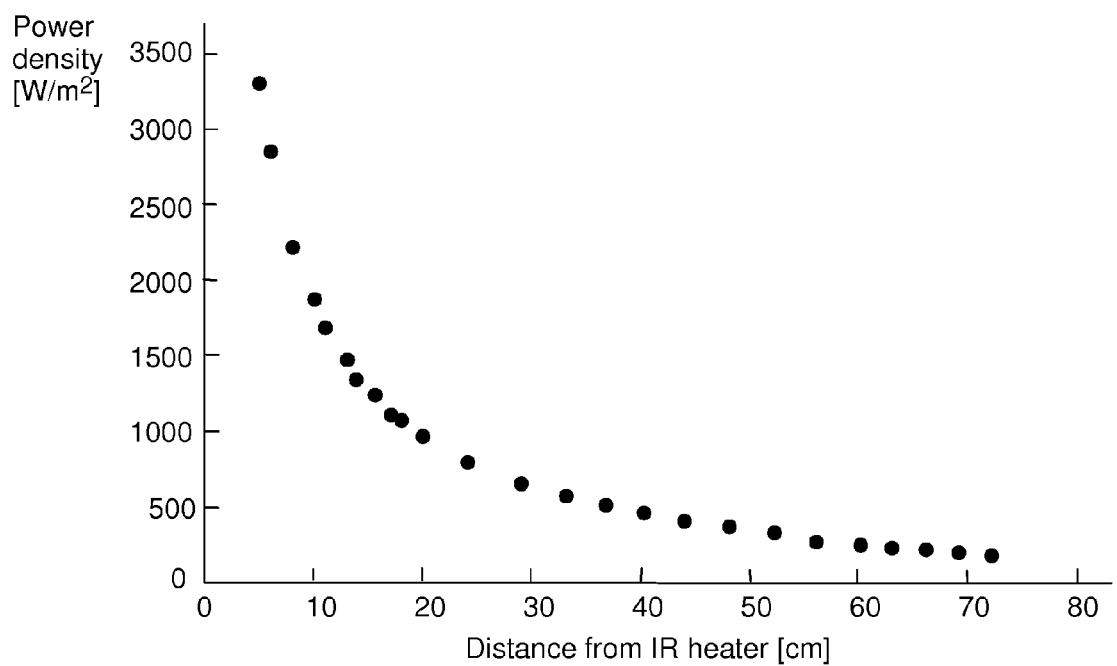
FIG. 14 shows measured power density of an infrared heater as a function of distance between the heater and a measurement point.

Dashed line in FIG. 13 represents the theoretical output spectrum of a medium wave IR emitter tube operating at 900° C. In this case the light source 200 comprises an IR emitter tube and a module where the tube is attached to. IR emitter tubes are provided e.g. by the Heraeus Noblelight corporation. The total output power of the emitter is plotted as a function of distance in FIG. 14.

Figure 15:
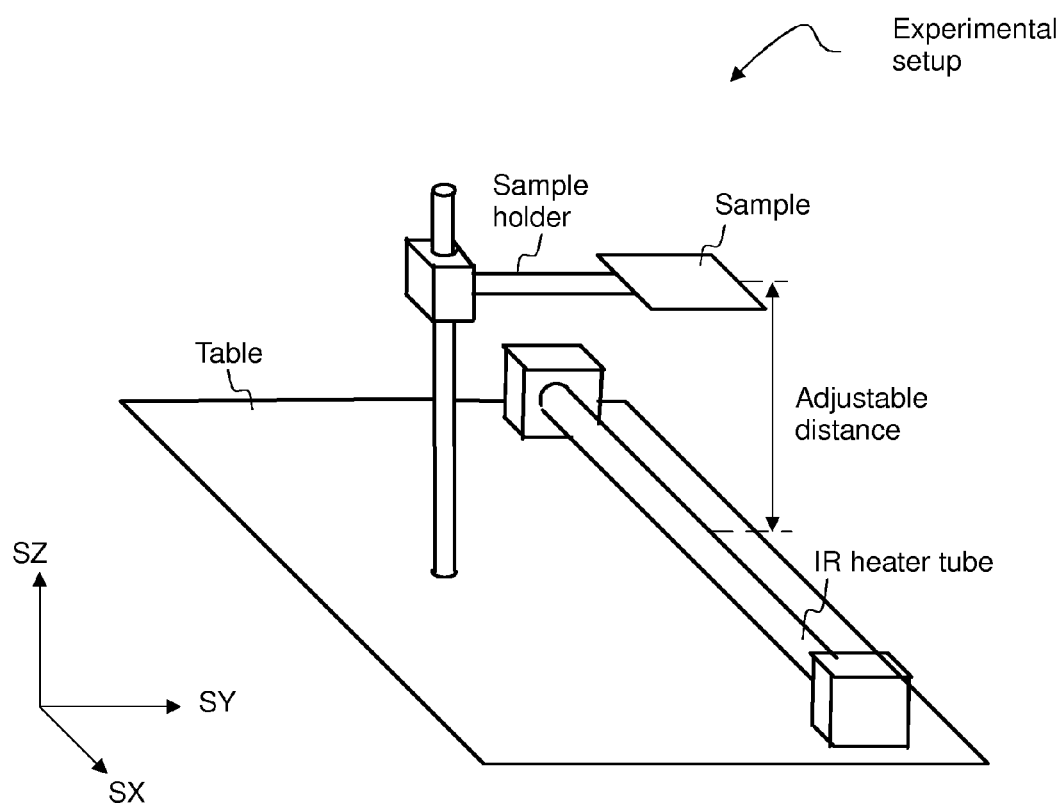
FIG. 15 shows, in a three dimensional view, an experimental set-up comprising an infrared heater and a sample, with a possibility to adjust the distance between the heater and the sample.
Figure 16A:
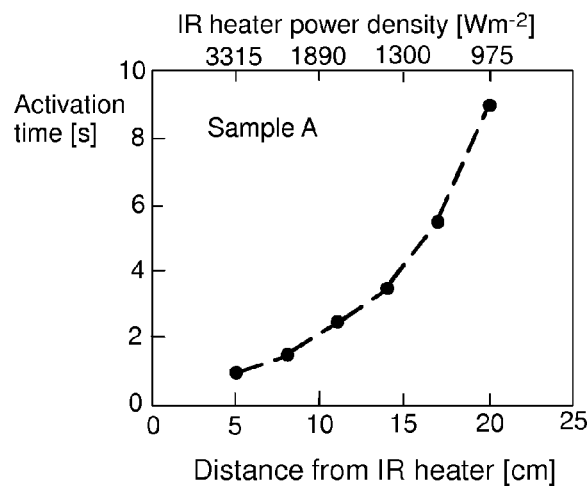
FIG. 16a shows activation time for a polyurethane sample A as a function of the radiation power density and distance.
Figure 16B:
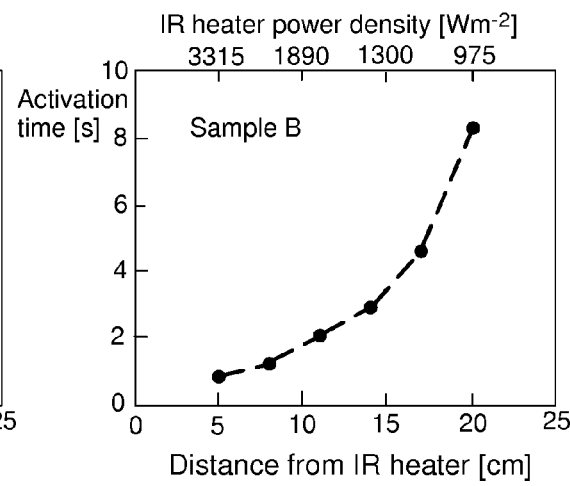
FIG. 16b shows activation time for a polyurethane sample B as a function of the radiation power density and distance.
Figure 16C:
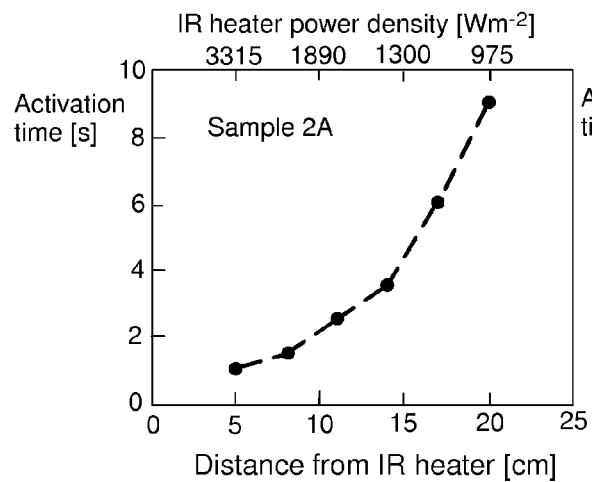
FIG. 16c shows activation time for a polyurethane sample 2A as a function of the radiation power density and distance.
Figure 16D:
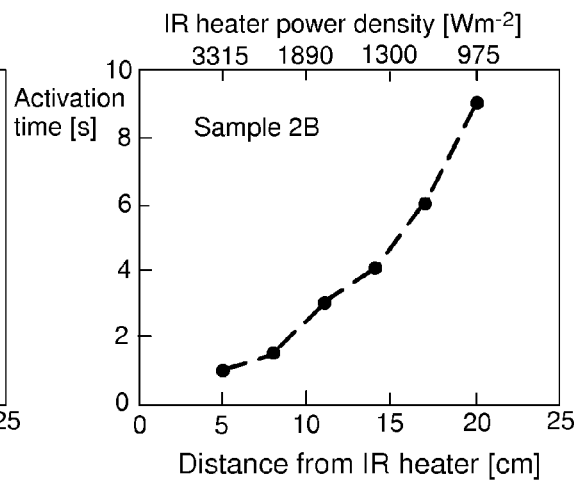
FIG. 16d shows activation time for a polyurethane sample 2B as a function of the radiation power density and distance.

FIG. 15 shows a setup for testing activation. The size of samples was 15 mm×60 mm. The speed of activation was examined at different distances from the emitter. The activation was verified by testing the level of adhesion the samples after activation. Special care was taken to irradiate the adhesive side of the sample films although it was proven during the tests that activation is possible to be performed from the other side as well.

In these tests the polyurethane adhesive was applied on a plastic film substrate, and the acrylic adhesive was applied on a paper substrate. The practical reason for this was due to the fact that these selections correspond the likely practical applications of these two adhesive types. Acrylic adhesive is not very suitable for clear labels because the adhesive has still a milky appearance after activation. The acrylic adhesive may be used on paper. The acrylic adhesive may be used on white surfaces.

The substrate (carrier layer 10) for polyurethane adhesive was clear BOPP (BOPP is an acronym for biaxially oriented polypropylene film).

The polyurethane adhesive on plastic film showed very repeatable results during the tests. The transition from an inactive sample to an active sample film was sharp. Thus, it was difficult to achieve a partially activated state. Typically, the sample was activated fully and reached an average tensile strength of 300 grams or the sample was not activated and it did not stick to a test surface at all.

The activation time for polyurethane on transparent films is shown as a function of power and distance in FIGS. 16a-16d. In FIGS. 16a-16d, the samples A,B,2A and 2B were all basically the same, and the polyurethane samples were all coated onto a biaxially oriented polypropylene film.

It was noticed that after the threshold activation time had passed, an increase in the irradiation time did not have a significant effect on the adhesion tensile strength. At short distances, the power of the IR emitter may damage the film (carrier layer 10) rapidly. At the distance of 5 cm, an exposure time of 2 seconds or more may cause notable bending of the film. At long exposures times at this distance, the film was damaged.

The acrylic adhesive needed more energy to activate. The activation time increased at long distances. This is probably due to fact that the acrylic adhesive had about 60% larger mass per unit area than the film A. Larger mass contributes to larger heat capacity, which in turn defines the energy needed to raise the temperature of the object by one degree Kelvin. The activation time for acrylic adhesive is shown in FIG. 17.

Figure 17:
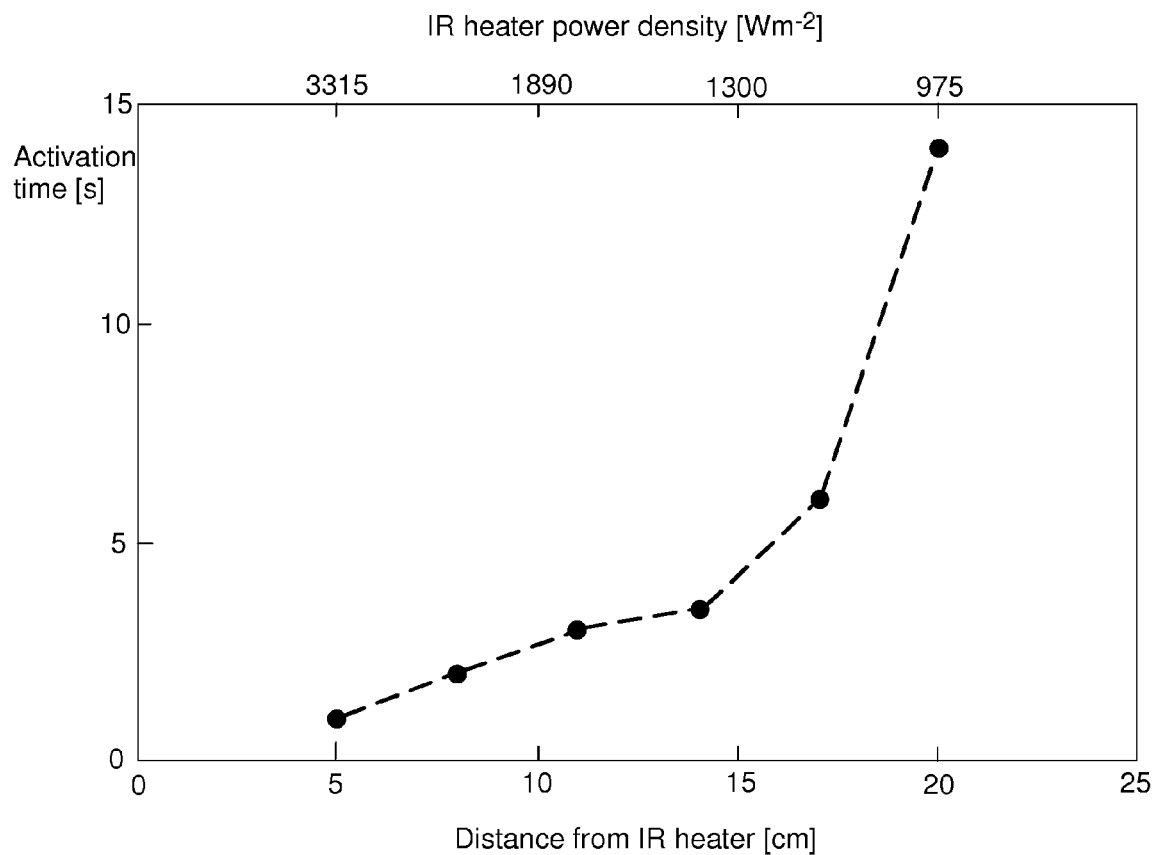
FIG. 17 shows activation time for acrylate adhesive on a paper carrier layer as a function of distance between the sample and the radiation source.

FIG. 17 shows that even though the activation took longer at long distances, one second was enough to activate the adhesive at the distance of 5 cm. Activation of acrylic adhesive was not as steep transition as with the polyurethane samples. Still, major improvement in tensile strength was not achieved by prolonging the irradiation time.

The results clearly show that the activation time grows in the square of the distance r. This dependence can be used to estimate the activation time at short distances. When the distance from the heater is less than 5 cm, the activation times are less than one second. Reliable manual measurements are hard to perform in this time scale and therefore fitting of $r^2$ dependent curves is used for estimating activation times.

Based on the measured data and $r^2$ fitting, the activation of both A and 2A samples should be possible in 0.2 seconds at the distance of 2.5 cm. The power density at that distance can be approximated by fitting a $1/r^2$ dependent curve to the data of measured power density. This yields an approximation of 14 kW/m². Required energy density U per area for activation can be calculated from these values by $$U = \frac{E}{A}\left[\frac{J}{m^2}\right] = \frac{P \cdot t}{A}\left[\frac{W \cdot s}{m^2}\right] \qquad (2)$$

giving about 3 kJ/m². E denotes energy, A denotes area, P denotes power, and t denotes time. The data of B samples did not enable well behaving fittings but the behavior was very similar to A samples. It is important to notice that values depend on the spectral distribution of the power.

Estimation of energy needed to activate acrylic adhesive in a time period shorter than or equal to 0.2 s is more challenging due to a large variation in the activation time results. Curve fitting does not produce very usable results but the behaviour at longer distance implies a need for slightly higher power than for the polyurethane adhesive. On the other hand, the acrylic adhesive on paper can withstand a higher IR intensity without being damaged. Thus, 30-60% higher power density could be used for roll of paper with acrylic adhesive to achieve similar activation times to the transparent film with polyurethane adhesive.

When more power density is needed, the distance to the heater can be shortened or a carbon emitter tube can be used. The carbon emitter provides approximately 80% more power density to the spectral region from 3 to 10 μm. The carbon emitter tube may operate at 1200° C. and the previous estimation of power increase may be based on the integral of Planck's law. The extra power may be associated with increased cost of IR tube and operating expenses.

The temperature of a thermal emitter may be e.g. in the range of 600° C. to 1250° C., in particular in the range of 800° C. to 1000° C.

The name of the carbon dioxide ($CO_2$) laser comes from the gain medium of the laser. The gain medium is the substance where the stimulated laser emission takes place. The gain medium defines the operating wavelength of the laser. The reason for studying $CO_2$ laser for activation is that it emits light at far infrared region (10.6 μm) where the activatable adhesives studied here efficiently absorb light, as seen from FIGS. 11 and 12.

CO2 lasers may be powerful and efficient in terms of light output and they are widely used in industrial applications. The spectral peak of the laser radiation may be at the wavelength 10.6 μm. The light source 200 may have beam modifying optics so that the size and position of the focus can be altered. The operation of the laser depends on duty cycle, operating frequency and the scanning field of the laser focus.

Figure 18:
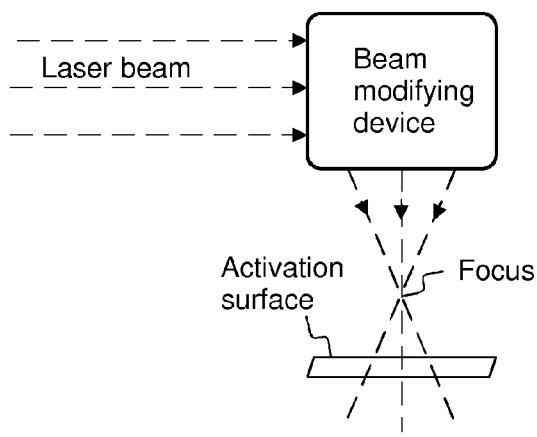
FIG. 18 shows, in a side view, a set-up for testing activation of the bonding layer by using a $CO_2$ laser.

Experiments were made by using a CO2 laser "SC x20" by the Rofin-Sinar corporation. The optical power of the SC x20 laser may be adjusted in the range of 5-200 W. For activation tests a duty cycle of 25/60 was used at a frequency of 50 kHz. This yields an average light power of 80 W. The adhesive film samples were placed out of focus (out of the focal distance) to avoid laser cutting. The laser spot diameter at the sample was about 10 mm. The spot was moved linearly by a scanner unit (beam modifying optics) during the activation time so as to activate an area of 10×40 $mm^2$. A schematic representation of the test setup is shown in FIG. 18.

The laser beam was swept across the sample very rapidly in about 0.04 seconds. After the laser sweep, the activation took place with a short but observable delay of about one second.

The activation in the transparent film may be clearly observable also as a decrease in the intensity of scattered light. When the adhesive layer becomes activated, which in other words means that the temperature of the adhesive film rises above the threshold, the adhesive film "melts" and this causes the number of small bubbles and/or other scattering origins to dissolve and blend into a more homogeneous adhesive layer. This transition may be observed optically as a decrease in the intensity of scattered light. This transition may be observed optically as a decrease in the intensity of scattered light, when compared with the intensity of transmitted light. This transition may be observed optically as a decrease in the intensity of scattered light, when compared with the intensity of light reflected from the bonding layer 20 by specular reflection.

This provides an opportunity to monitor the state of the activation optically and use the measurement result for controlling he activation process, for example by adjusting the time for exposure and/or power level of exposure. The control may be implemented as a closed loop control.

Figure 19:
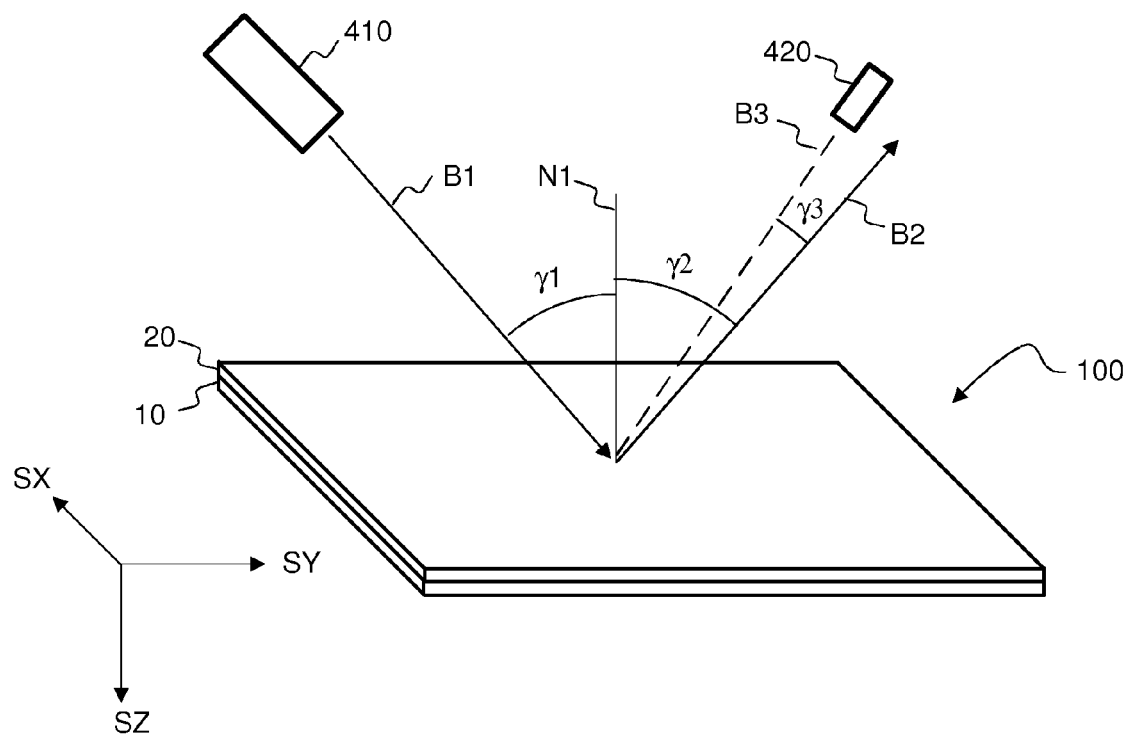
FIG. 19 shows, in a three dimensional view, optical monitoring of the state of the bonding layer.

Referring to FIG. 19, the optical monitoring apparatus may comprise a light source 410 and an optical detector 420. The light source 410 may be e.g. a laser which provide a light beam B1. Specular reflection of the beam B1 from the bonding layer 20 may provide a reflected beam B2 by specular reflection. The output angle γ2 of the beam B2 with respect to the surface normal N1 is equal to the input angle γ1 of the beam B1. A portion of the light of the beam B1 may be scattered in directions which deviate from the direction of the specularly reflected beam B2. The detector 420 may be arranged to measure the intensity of scattered light B3, which is scattered in a direction defined by an angle γ3 with respect to the direction of the specularly reflected beam B2. The angle γ3 is substantially greater than zero.

When the surface of the bonding layer 20 becomes smoother, this may reduce the intensity of scattered light B3 impinging on the detector 420, and this may increase the intensity of the beam B2.

When the bonding layer 20 becomes more granular or when the surface of the bonding layer 20 is cracked, this may increase the intensity of scattered light B3 impinging on the detector 420, and this may reduce the intensity of the beam B2.

A further detector may also be arranged to monitor the intensity of the specularly reflected beam B2

The light source 410 may be e.g. a laser diode emitting light at 670 nm. The detector 420 may be comprise e.g. a photodiode and a narrowband interference filter, which rejects wavelengths deviating from 670 nm.

The same laser parameters were used for both polyurethane adhesive covered transparent film and acrylate adhesive covered paper samples. Activated samples attached firmly to a glass surface in the adhesion tests.

The laser activation was possible through both sides of the samples without a significant difference in the activation level. In other words, the bonding layer 20 may be activated also by using infrared light transmitted through the carrier layer 10.

The energy density in the laser activation was approximately 8 $kJ/m^2$. The value is in the same order of magnitude with the IR heater activation.

With the $CO_2$ laser, the operating parameters were found to have a drastic effect on the result. The radiative energy should be brought to the film with the right pace. A common problem with pulsed lasers is that they may have a high peak power which may damage the film. On the other hand, the average optical power may be so low that it does not produce wanted results. The $CO_2$ laser's wealth of adjustments makes it possible to use it for adhesive activation and to tailor the exposure to a specific situation. For thermal heating, high repetition rate and high duty cycle are typically preferred in order to avoid damage. A continuous wave laser might be an optimum laser source for heating the adhesive films.

The spectral distribution of the laser light is narrow compared with the IR heater. This means that the energy is absorbed substantially only at the specific output wavelength of the laser. Far infrared radiation usually excites the rovibrational states of molecules. The energy is transferred to other rovibrational states through relaxation, thereby heating up the film.

The polyurethane adhesive and the acrylic adhesive without dyes did not have significant absorption in the ultraviolet (UV) and visible range (VIS) of spectrum. These adhesives may be activated by using infrared light IR1. At the strong absorption bands, the adhesives may be activated even without addition of a dye.

In case of the polyurethane adhesive, crystalline polyester segments melt or transform into a clear and tacky amorphous state at a characteristic melting temperature.

In case of the acrylic adhesive, platicisers may be melted and mixed with the acrylic components at a characteristic melting temperature, thereby increasing tackiness and transparency.

The activation in the polyurethane adhesive on transparent plastic films seems to be faster than that in the acrylic adhesive on paper substrate. Hence, after exceeding the melting temperature, the transparent film may always be fully activated. The slower activation process in the acrylic adhesive for paper also allows a partially activated adhesive, if the temperature of the adhesive is only a very short time above the critical melting temperature. The acrylic adhesive does not have enough time to be fully activated in these cases.

Activation by the IR heater and the $CO_2$ laser may be applicable to production line. Both these light sources 200 may provide an activation energy in the range of 3-8 kJ/m². IR heater may provide activation in less than one second while the $CO_2$ laser can transfer the needed energy in hundredths of a second. The $CO_2$ laser can transfer the sufficient activation energy in a time which is shorter than the response time of the transparent adhesive film. Thermal activation may take place in the order of a second after the laser exposure.

An IR heater (thermal radiator) makes it possible to activate large areas at low cost and relatively fast speed. The $CO_2$ laser can be even faster with small surface areas but the activation time increases as a function of the activation area.

In addition to activation of the adhesive by heat, it was also found that the $CO_2$ laser could also be used for the die-cutting of the labels. Therefore it is possible that the same laser unit could be used for both functions. This also applies to other type of activation lasers, for example, to the semiconductor lasers that might be used with adhesives added with special absorption increasing near-IR dyes. One possibility to switch between activation and cutting modes is to simply move the target from and into the focus of the laser beam. In out of focus position, the beam has a larger diameter and the power level is suitable to activate the target without damaging it. For larger areas, the beam can be sweeped rapidly over the surface to activated. Then, moving the beam into in focus position, starts the cutting phase. The focusing effect can also be used to adjust the power level to suit the particular adhesive material.

In an embodiment, the bonding layer 20 may comprise light-scattering filler material in order to increase the opacity of the bonding layer 20. For example, particles of titanium dioxide ($TiO_2$) may be used as a filler material. Scattering of light in the bonding layer 20 may increase an effective length of optical path of the heating radiation IR1 in the bonding layer 20, thereby increasing absorption of the radiation IR1 in bonding layer 20.

Labels 100 may be attached to items e.g. in order to visually show information associated with the item. The information may comprise e.g. trademark of a manufacturer, advertising information, price information, or operating instructions. The item 200 may be e.g. a glass bottle, a plastic bottle, a tin can, a plastic package, a cardboard package.

A label may comprise machine-readable information, e.g. a barcode.

A label may comprise an RFID transponder. When the label is attached to an item, information associated with the item and/or with the label may be read in a wireless manner by using a stationary or a portable RFID reader. RFID refers to Radio Frequency Identification.

Labels may be used enhance or modify visual appearance of items. Labels may be used to protect an item e.g. against wear. Labels may also be used as seals to indicate that an item has not been tampered. A broken seal may indicate that the item has been tampered (opened).

The various aspects of the invention are illustrated by the following examples:

EXAMPLE 1

A method for attaching a label (100) to a surface of an item (300), the label (100) comprising a carrier layer (10) and a bonding layer (20), the method comprising heating the bonding layer (20) by using infrared light (IR1) such the infrared light (IR1) has a maximum spectral irradiance at a peak wavelength ($\lambda_P$), wherein the bonding layer (20) has an absorbing spectral region which spectrally matches with said peak wavelength ($\lambda_P$).

EXAMPLE 2

The method of example 1 wherein the spectrum of the infrared light (IR1) matches with the spectral absorbance of the bonding layer (20) such that at least 20% of the optical power of infrared light (IR1) impinging on the bonding layer (20) is absorbed in the bonding layer (20).

EXAMPLE 3

The method of example 1 or 2 wherein a maximum spectral irradiance is at a wavelength ($\lambda_P$) where a spectral absorbance of the bonding layer (20) is substantially higher than a spectral absorbance of the carrier layer (10).

EXAMPLE 4

The method according to any of the examples 1 to 3 wherein the carrier layer (10) is paper.

EXAMPLE 5

The method according to any of the examples 1 to 3 wherein the carrier layer (10) is plastic.

EXAMPLE 6

The method of example 5 wherein the carrier layer (10) is transparent in the visible region (VIS) of light.

EXAMPLE 7

The method according to any of the examples 1 to 6 wherein the bonding layer (20) comprises an acrylic adhesive, which is in a non-tacky state prior to said heating.

EXAMPLE 8

The method according to any of the examples 1 to 6 wherein the bonding layer (20) comprises a polyurethane adhesive, which is in a non-tacky state prior to said heating.

EXAMPLE 9

The method according to any of the examples 1 to 8 wherein the bonding layer (20) comprises a dye, which absorbs infrared light (IR1).

EXAMPLE 10

The method of example 9 wherein the infrared light (IR1) is provided by a tungsten halogen lamp (200),

EXAMPLE 11

The method of example 9 wherein the infrared light (IR1) is provided by a laser diode (200) emitting light at a wavelength, which is in the range of 800 nm to 1.6 µm.

EXAMPLE 12

The method according to any of the examples 1 to 8 wherein the infrared light (IR1) is provided by a carbon dioxide laser (200).

EXAMPLE 13

The method according to example 11 or 12 further comprising cutting the label (100) from a web (WEB) by using said laser (200).

EXAMPLE 14

The method according to any of the examples 1 to 8 wherein the infrared light (IR1) is provided by a thermal radiator (200), wherein the temperature of the thermal radiator (200) is in the range of 800° C. to 1000° C.

EXAMPLE 15

The method according to any of the examples 1 to 14 wherein the infrared light (IR1) is transmitted through the carrier layer (10) before heating the bonding layer (20).

EXAMPLE 16

The method according to any of the examples 1 to 15 further comprising monitoring the state of the bonding layer by using light scattered from the bonding layer (20).

EXAMPLE 17

The method according to any of the examples 1 to 16 wherein the bonding layer (20) comprises a light-scattering filler material.

For the person skilled in the art, it will be clear that modifications and variations of the devices and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A method for attaching a label to a surface of an item, the label comprising a carrier layer and a bonding layer, wherein the bonding layer comprises an acrylic adhesive, the method comprising:
heating the bonding layer using infrared light such that the infrared light has a spectral peak and a maximum spectral irradiance at a peak wavelength of the spectral peak, wherein the acrylic adhesive has an absorbing spectral region that substantially matches with said peak wavelength, such that the absorbing spectral region spectrally overlaps at least 50% of a full-width-at-half-maximum width of the spectral peak, and wherein the absorbing spectral region is at wavelengths equal to or greater than 3 µm.

2. The method according to claim 1, wherein the carrier layer is plastic.

3. The method according to claim 2, wherein the carrier layer is transparent in the visible region of light.

4. The method according to claim 1, wherein an absorbance of the bonding layer at said peak wavelength is greater than or equal to two times an average absorbance of the bonding layer, and wherein said average absorbance is determined in a wavelength range of from 2.5 µm to 5 µm.

5. The method according to claim 1, wherein a maximum spectral irradiance is at a wavelength where a spectral absorbance of the bonding layer is substantially higher than a spectral absorbance of the carrier layer, such that the carrier layer is heated less than the bonding layer.

6. The method according to claim 1, wherein the carrier layer is paper.

7. The method according to claim 1, wherein the acrylic adhesive is in a non-tacky state prior to said heating, and wherein the acrylic adhesive is irreversibly changed into a tacky state by said heating.

8. The method according to claim 1, wherein the infrared light is provided by a carbon dioxide laser.

9. The method according to claim 1, wherein the infrared light is provided by a thermal radiator, wherein a temperature of the thermal radiator is in a range of 800° C. to 1000° C., and wherein the spectral properties of the infrared light are modified by optical filtering.

10. The method according to claim 1, wherein the infrared light is transmitted through the carrier layer before heating the bonding layer.

11. The method according to claim 1, further comprising:
monitoring a state of the bonding layer by using light scattered from the bonding layer.

12. The method according to claim 1, wherein the bonding layer comprises a light-scattering filler material.

13. The method according to claim 1, wherein the infrared light is absorbed at an absorbing spectral band of the acrylic adhesive, and wherein the bonding layer comprises the acrylic adhesive without any specific activation improving dyes.

14. The method according to claim 1, wherein the duration of irradiation is shorter than 0.2 seconds.

15. A method for attaching a label to a surface of an item, the label comprising a carrier layer and a bonding layer, the bonding layer comprising polyurethane adhesive, the method comprising:
heating the bonding layer using infrared light such that the infrared light has a spectral peak and a maximum spectral irradiance at a peak wavelength of the spectral peak that substantially matches with an absorbing spectral region of the polyurethane adhesive, wherein the absorbing spectral region spectrally overlaps at least 50% of a full-width-at-half-maximum width of the spectral peak, and wherein the absorbing spectral region is at wavelengths equal to or greater than 3 µm.

16. The method according to claim 15, wherein a maximum spectral irradiance is at a wavelength where a spectral absorbance of the bonding layer is substantially higher than a spectral absorbance of the carrier layer.

17. The method according to claim 15, wherein the carrier layer is plastic and transparent in the visible region of light.

18. The method according to claim 15, wherein the polyurethane adhesive is in a non-tacky state prior to said heating.

19. The method according to claim 15, wherein the infrared light is provided by a thermal radiator, wherein a temperature of the thermal radiator is in a range of 800° C. to 1000° C., and wherein the spectral properties of the infrared light are modified by filtering.

20. The method according to claim 15, wherein the infrared light has a maximum spectral irradiance at a peak wavelength, and wherein an absorbance of the bonding layer at said peak wavelength is greater than or equal to two times an average absorbance of the bonding layer, wherein the average absorbance is in a wavelength range of from 2.5 μm to 5 μm.

\* \* \* \* \*